(12) United States Patent
Price et al.

(10) Patent No.: US 12,441,496 B2
(45) Date of Patent: Oct. 14, 2025

(54) SYSTEMS AND METHODS FOR DYNAMIC ROTARY BLOW-FILL-SEAL (BFS) MACHINE COOLING

(71) Applicant: Koska Family Limited, East (GB)

(72) Inventors: Jeff Price, Windermere, FL (US); Tim Kram, Indian Hills, CO (US)

(73) Assignee: Koska Familiy Limited, East (GB)

( * ) Notice: Subject to any disclaimer, the term of this patent is extended or adjusted under 35 U.S.C. 154(b) by 0 days.

(21) Appl. No.: 18/663,042

(22) Filed: May 13, 2024

(65) Prior Publication Data

US 2024/0294282 A1 Sep. 5, 2024

Related U.S. Application Data

(63) Continuation of application No. PCT/US2022/051807, filed on Dec. 5, 2022.

(60) Provisional application No. 63/285,969, filed on Dec. 3, 2021.

(51) Int. Cl.
| | |
|---|---|
| *B65B 3/00* | (2006.01) |
| *B29C 49/48* | (2006.01) |
| *B65B 3/02* | (2006.01) |
| *B65B 63/08* | (2006.01) |

(52) U.S. Cl.
CPC .......... *B65B 3/022* (2013.01); *B29C 49/4823* (2013.01); *B65B 3/003* (2013.01); *B65B 63/08* (2013.01); *B29C 2049/4833* (2013.01)

(58) Field of Classification Search
CPC .......... B65B 3/003; B65B 3/08; B65B 3/022; B29C 49/483; B29C 2049/4833
See application file for complete search history.

(56) References Cited

U.S. PATENT DOCUMENTS

2024/0294282 A1* 9/2024 Price ................... B29C 49/4823

FOREIGN PATENT DOCUMENTS

| CN | 105291406 A | * | 2/2016 | |
|---|---|---|---|---|
| CN | 205045805 U | | 2/2016 | |
| CN | 110844138 A | | 2/2020 | |
| CN | 111483153 A | | 8/2020 | |
| EP | 4341066 B1 | * | 11/2024 | ............. B29C 49/62 |
| WO | 2015138844 | | 9/2015 | |
| WO | 2023102256 | | 6/2023 | |

OTHER PUBLICATIONS

International Search Report for Application PCT/US22/51807 dated Apr. 24, 2023; 4 pps.
Written Opinion for Application PCT/US22/51807 dated Apr. 24, 2023; 8 pps.

* cited by examiner

*Primary Examiner* — Eyamindae C Jallow
(74) *Attorney, Agent, or Firm* — Rowan Tree Law Group, PLLC; Carson C.K. Fincham

(57) ABSTRACT

Systems and methods for automatic and dynamic temperature adjustment and over-cooling of a rotary Blow-Fill-Seal (BFS) manufacturing device to reduce the fill product temperature such as for filling of BFS vials with cold-temperature vaccines.

18 Claims, 10 Drawing Sheets

SYSTEMS AND METHODS FOR DYNAMIC ROTARY BLOW-FILL-SEAL (BFS) MACHINE COOLING

CROSS-REFERENCE TO RELATED APPLICATIONS

This Application is a Continuation Application of PCT Application No. PCT/US22/51807, filed on Dec. 5, 2022 in the name of Price et al. and titled SYSTEMS AND METHODS FOR DYNAMIC ROTARY BLOW-FILL-SEAL (BFS) MACHINE COOLING, which PCT claims priority to, and is a Non-provisional of, U.S. Provisional Patent Application No. 63/285,969 filed on Dec. 3, 2021 and titled SYSTEMS AND METHODS FOR ROTARY BLOW-FILL-SEAL (BFS) MACHINE COOLING. Each of these Applications is hereby incorporated by reference herein in its entirety and for all purposes.

BACKGROUND

Blow-Fill-Seal (BFS) manufacturing is an advanced aseptic manufacturing technique first developed in the 1930's which has been utilized to produce various forms of plastic products in the United States since the 1960's. Recently, BFS manufacturing has been utilized to introduce cutting-edge pharmaceutical delivery products such as those offered by ApiJect™ Systems, Inc. of Stamford, CT, which offer many advantages with respect to the standard multi-dose glass vials and separate syringes utilized for medicament storage and delivery.

The basic BFS process includes: (1) vertically extruding a plastic resin to form a tube called a parison, (2) engaging the parison with a multi-part primary mold (to shape desired product receptacles), (3) filling the shaped receptacles with a desired product via filling mandrels, (4) engaging the parison with a multi-part secondary mold (to seal the receptacles), and (5) labeling, inspection, packaging, storage, and/or distribution. There are two distinct types of BFS machines currently in use: (i) shuttle machines (e.g., ASEPTECH® Blow/Fill/Seal machines such as the Model 640 available from Weiler™ Engineering, Inc. of Elgin, IL) and (ii) rotary machines (e.g., a Bottelpack™ bp460-20 machine available from Rommelag Kunststoff-Maschinen Vertriebsgesellschaft mbH of Waiblingen, Germany). Rotary-style BFS machines offer a much higher throughput than shuttle-style machines, but have limitations that shuttle-style machines may not be subject to.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Embodiments of the present invention provide systems and methods for dynamic rotary Blow-Fill-Seal (BFS) cooling. The speed and complexity of a rotary BFS machine may, for example, cause certain portions of the BFS machine (and/or related objects such as the fill product) to increase in temperature beyond desirable levels. The simpler configuration and operation of a shuttle-style machine may generally not be subject to increasing such temperatures beyond desirable levels (e.g., the filling mandrels of a shuttle machine are located outside of the parison head, while in a rotary machine the filling mandrels are located within the parison head, creating enhanced heat gain issues). Typical rotary BFS machines available in the industry do provide for simplistic and/or static cooling which is primarily directed to maintaining the machine in good operational order (e.g., preventing overheating of the mechanical components of the machine). For normal rotary BFS manufacturing operations, such simplistic and/or static cooling is adequate.

Applicant has realized, however, that in the case where a rotary BFS machine is utilized to produce BFS containers that are prefilled with more sensitive medicaments such as vaccines for Severe Acute Respiratory Syndrome Corona-Virus 2 (SARS-CoV-2) or COVID-19, the simplistic and/or static cooling mechanisms of typical machines may be inadequate. Because the heating, extrusion, molding, and sealing of the plastic resin/parison required for BFS manufacturing is highly temperature sensitive, however, changes to the existing cooling mechanisms can significantly and adversely affect the manufactured product (e.g., the formed "ampules", vials, containers, bottles, etc.). Accordingly, described herein are systems, methods, and articles of manufacture for providing enhanced and/or dynamically responsive cooling for rotary BFS machines that are specifically structured and configured to provide enhanced cooling capabilities without negatively impacting the BFS product.

II. Dynamically-Cooled BFS Manufacturing Systems

Figure 1:
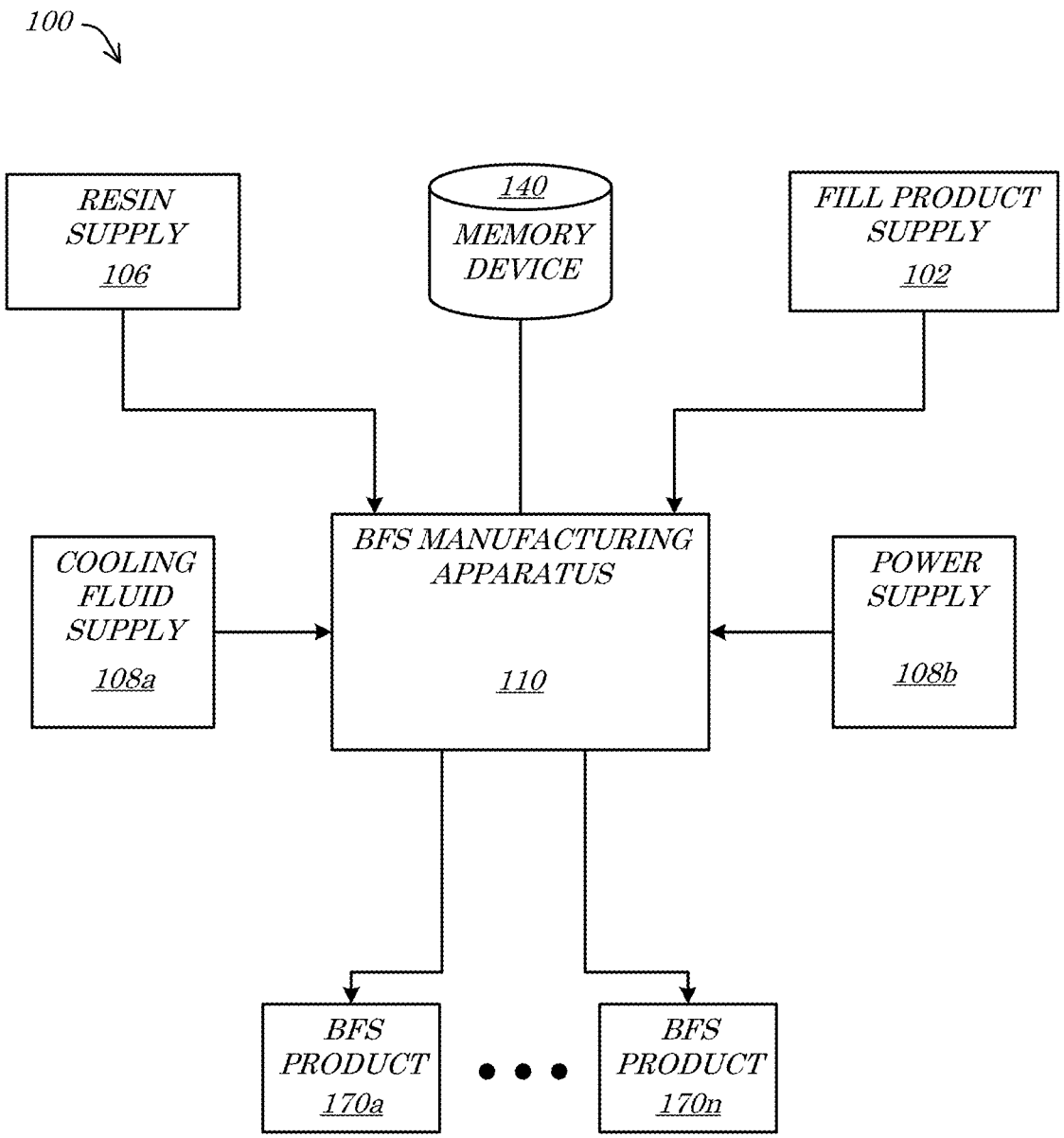
FIG. 1 is a block diagram a Blow-Fill-Seal (BFS) manufacturing system according to some embodiments.

Referring initially to FIG. 1, a block diagram of a BFS manufacturing system 100 according to some embodiments is shown. In some embodiments, the BFS manufacturing system 100 may comprise a fill product supply 102, a resin supply 106, and/or one or more other inputs and/or supplies 108a-b (such as a cooling fluid supply 108a and/or a power supply 108b) that may be coupled to and/or in communication with a BFS manufacturing machine or apparatus 110. The BFS manufacturing apparatus 110 may, for example, utilize inputs, materials, energy, services, and/or other resources provided by any or all of the fill product supply 102, the resin supply 106, and/or the one or more other supplies 108a-b to conduct a BFS manufacturing process. According to some embodiments, the BFS manufacturing apparatus 110 may comprise one or more of a Bottelpack™ bp434 bp460-15, bp460-20, and/or bp461 machine available from Rommelag Kunststoff-Maschinen Vertriebsgesellschaft mbH of Waiblingen, Germany. In some embodiments, the BFS manufacturing apparatus 110 may conduct the BFS manufacturing process by executing instructions stored in a memory device 140 (e.g., that is in communication with the BFS manufacturing apparatus 110). The BFS manufacturing apparatus 110 may, for example, utilize plastic resin (not separately shown) obtained from the resin supply 106 and power (also not separately shown) from the power supply 108b to operate various mechanisms (not shown) of the BFS manufacturing apparatus 110 to produce a plastic container, vial, bottle, and/or other formed object that is filled with fill product (also not separately shown) from the fill product supply 102 and then sealed. In such a manner, for example, the BFS manufacturing apparatus 110 may create, form, fill, mold, and/or otherwise generate or define a plurality of BFS products 170a-n that comprise sterile pre-filled plastic containers. In some embodiments, the BFS manufacturing apparatus 110 may utilize a cooling fluid (not separately shown) from the cooling fluid supply 108a to cool (and/or remove heat from) one of more of the various mechanisms and/or portions of the BFS manufacturing apparatus 110 and/or to cool (and/or remove heat from) the fill product, the resin, and/or the BFS products 170a-n.

According to some embodiments, the fill product supply 102 may comprise a fluid reservoir that supplies the fill product to the BFS manufacturing apparatus 110 (e.g., via various hoses, pipes, tubes, and/or other conduits not separately shown). The fill product may, in some embodiments, comprise any type or quantity of fluid such as, but not limited to, an aqueous solution, a vaccine, a therapeutic agent, a biologic agent, and/or one or more other medicines, drug agents, and/or medicaments. In some embodiments, the resin supply 106 may comprise a bag, carton, hopper, and/or reservoir that supplies the plastic resin material (e.g., via various hoses, pipes, tubes, chutes, and/or other conduits not separately shown) to the BFS manufacturing apparatus 110 so that the BFS manufacturing apparatus 110 may melt and extrude the plastic resin into two (2) or more plastic sheets that form a plastic parison. The plastic parison may then be acted upon by the BFS manufacturing apparatus 110 (e.g., utilizing blown air and/or applied vacuum) to mold a portion of the plastic parison into a desired shape. The molded/formed plastic shape may then be selectively filled with the fill product and then sealed to form the BFS products 170a-n.

In some embodiments, the cooling fluid supply 108a may comprise a fluid source such as a reservoir, piping network, and/or a local environment (e.g., in the case that the cooling fluid comprises air) that supplies the cooling fluid to the BFS manufacturing apparatus 110 (e.g., via various hoses, pipes, tubes, and/or other conduits not separately shown). The cooling fluid may comprise, for example, water, glycol, air, and/or a refrigerant (such as Freon™ available from the Chemours Company of Wilmington, DE) that the BFS manufacturing apparatus 110 utilizes to cool (or remove heat from) various components. According to some embodiments, the power supply 108b may comprise any type or configuration of power source and/or storage such as a battery, an Alternating Current (AC) source, a Direct Current (DC) source, an AC/DC adapter, solar cells, a turbine, and/or a generator. The power supply 108b may, for example, provide electrical power and/or energy to the BFS manufacturing apparatus 110 so that the BFS manufacturing apparatus 110 may operate various electrical components thereof.

According to some embodiments, the BFS products 170a-n manufactured by the BFS manufacturing apparatus 110 may comprise any type or configuration of BFS bottles, vials, ampules, and/or containers that are or become known or practicable. The BFS products 170a-n may comprise, for example, one or more pre-filled, single-dose BFS vials such as those configured for single-dose human injections as described in U.S. Patent Application Publication No. 2022/0323301 and/or International Patent Application Publication No. WO 2021-207040 A1. In some embodiments, the BFS products 170a-n may be formed by the BFS manufacturing apparatus 110 in a manner that utilizes the cooling fluid to provide for lower temperature formed BFS products 170a-n while maintaining (e.g., via dynamic cooling application/settings) the integrity of the molded/formed containers.

Fewer or more components 102, 106, 108a-n, 110, 140, 170a-n and/or various configurations of the depicted components 102, 106, 108a-n, 110, 140, 170a-n may be included in the BFS manufacturing system 100 without deviating from the scope of embodiments described herein. In some embodiments, the components 102, 106, 108a-n, 110, 140, 170a-n may be similar in configuration and/or functionality to similarly named and/or numbered components as described herein. In some embodiments, the BFS manufacturing system 100 (and/or portion thereof) may comprise a dynamically-cooled rotary BFS manufacturing system programmed and/or otherwise configured to execute, conduct, and/or facilitate one or more methods (e.g., the method 400 of FIG. 4 herein) for selective and/or dynamic BFS cooling, as described herein.

Figure 2:
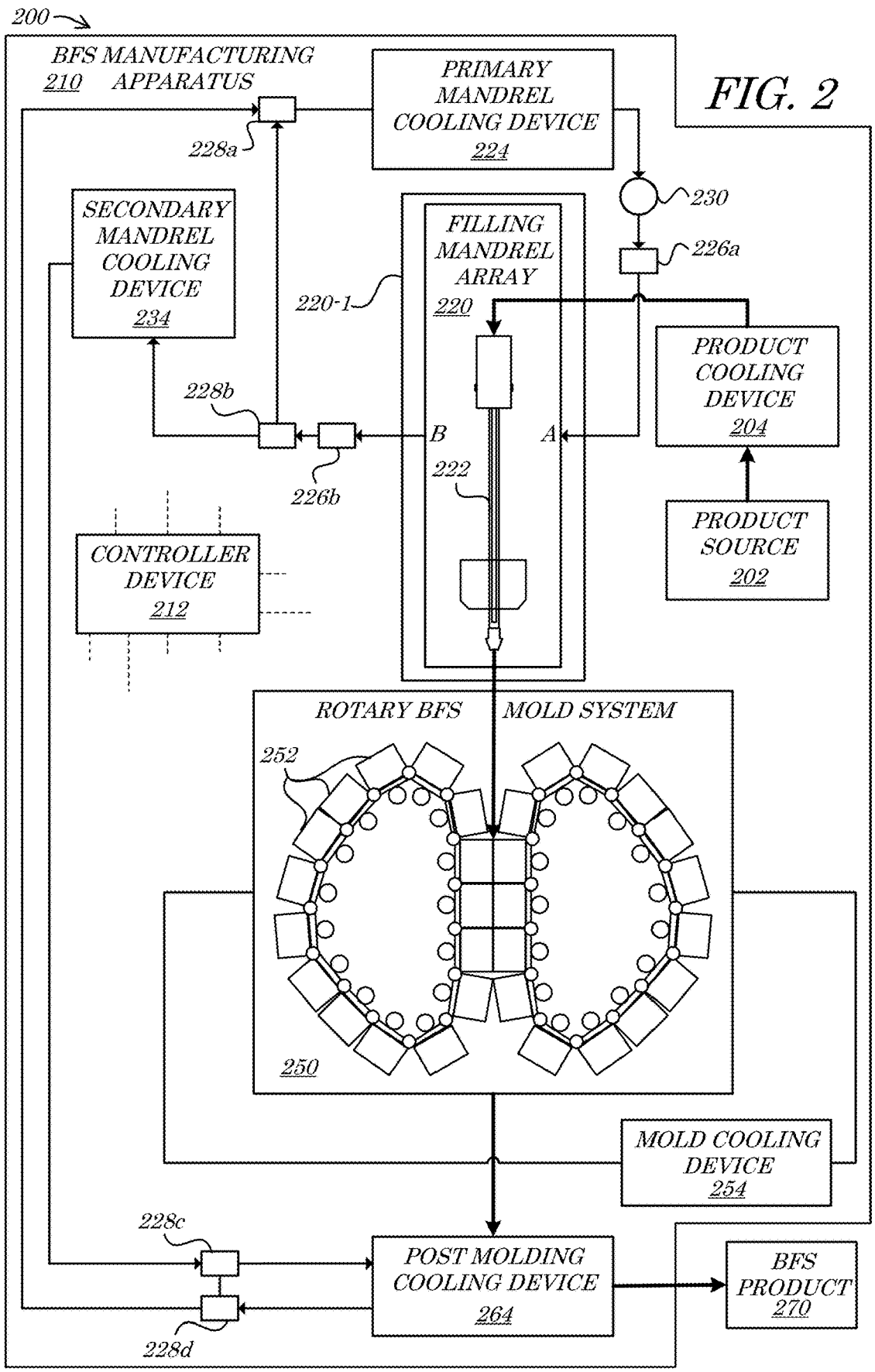
FIG. 2 is a block diagram a rotary BFS manufacturing system according to some embodiments.

Turning to FIG. 2, a block diagram of a rotary BFS manufacturing system 200 according to some embodiments is shown. In some embodiments, the rotary BFS manufacturing system 200 may comprise a product source 202 and/or a product cooling device 204 coupled to cool (or remove heat from a fill product (not separately shown)) provided to a BFS manufacturing machine or apparatus 210, e.g., controlled and/or operated by (and/or via) a controller device 212. The controller device 212 may comprise, for example, one or more electronic processing devices (e.g., computers, circuits, and/or electrical buses) and/or associated electronic data storage devices (e.g., computer memory devices storing operating instructions). According to some embodiments, the product source 202 may comprise a liquid product reservoir that provides fill product (e.g., a medicament such as a vaccine) to the product cooling device 204. While the product source 202 and the product cooling device 204 are depicted as being part of or coupled to the BFS manufacturing apparatus 210, in some embodiments either or both of the product source 202 and the product cooling device 204 may be disposed external to the BFS manufacturing apparatus 210 and may simply be in communication (e.g., fluid and/or electrical communication) with the BFS manufacturing apparatus 210. In some embodiments, the BFS manufacturing apparatus 210 may comprise, and/or the fill product may be provided from the product cooling device 204 to (or through) a filling mandrel array 220. The filling mandrel array 220 may comprise, for example, a plurality of filling needles or mandrels 222 (e.g., fifteen (15), twenty (20), or twenty-five (25), depending upon the model/configuration of the BFS manufacturing apparatus 210) coupled to be automatically and/or selectively engaged with (or by) the BFS manufacturing apparatus 210 (e.g., the controller device 212 thereof, that may be in communication with one or more of the product source 202, the product cooling device 204, the filling mandrel array 220, and/or individual mandrels 222 thereof). In some embodiments, such as in the case that the BFS manufacturing apparatus 210 comprises a rotary-style BFS machine, the filling mandrel array 220 may be disposed in, coupled to, and/or in communication with an extrusion device and/or parison head 220-1. As the extrusion device and/or parison head 220-1 utilize heat to extrude plastic resin into a plastic parison (not shown) in which the filling mandrel array 220 is disposed, the filling mandrel array 220 may be cooled to compensate for and/or counteract the applied heating.

According to some embodiments, for example, the filling mandrel array 220 (and/or the mandrels 222 thereof) may be coupled to a primary mandrel cooling device 224. The primary mandrel cooling device 224 may, for example, comprise a first chilling unit coupled to provide cooling (e.g., remove heat from) the filling mandrel array 220 (and/or the mandrels 222 thereof). In some embodiments, the rotary BFS manufacturing system 200 and/or the BFS manufacturing apparatus 210 may comprise one or more temperature sensors 226*a-b*, valves 228*a-d*, and/or pumps 230 that are in fluid communication with (e.g., hydraulically coupled to) the filling mandrel array 220 and the primary mandrel cooling device 224. The various temperature sensors 226*a-b*, valves 228*a-d*, pumps 230, the primary mandrel cooling device 224, and/or any conduits and/or connections thereof may, for example, define a mandrel cooling circuit that directs one or more cooling fluids through the circuit to cool and/or remove heat from the filling mandrel array 220 (and/or one or more of the individual mandrels 222 thereof). According to some embodiments, the rotary BFS manufacturing system 200 and/or the BFS manufacturing apparatus 210 may alternatively or additionally comprise, a secondary mandrel cooling device 234 coupled between the primary mandrel cooling device 224 and the filling mandrel array 220 (and/or the mandrels 222 thereof). The secondary mandrel cooling device 234 may comprise a second chilling unit that forms part of the mandrel cooling circuit, for example, or may define and/or comprise a secondary mandrel cooling circuit (e.g., with the primary mandrel cooling device 224 comprising and/or defining a primary mandrel cooling circuit).

In some embodiments, the secondary mandrel cooling device 234 may be automatically and/or selectively activated (and/or deactivated) to enhance and/or alter the cooling capacity with respect to the filling mandrel array 220 (and/or the mandrels 222 thereof). The primary mandrel cooling device 224 may be automatically engaged to provide cooling during a first operational mode and/or while the rotary BFS manufacturing system 200 and/or the BFS manufacturing apparatus 210 operates within a first set of parameters and/or thresholds, for example, and the secondary mandrel cooling device 234 may be automatically engaged to provide cooling during a second operational mode and/or while the rotary BFS manufacturing system 200 and/or the BFS manufacturing apparatus 210 operates within a second set of parameters and/or thresholds. In some embodiments, the primary mandrel cooling device 224 may be operable to cool the fill product (e.g., as it flows through the mandrels 222) to between twenty degrees Celsius (20° C.) and fifty degrees Celsius (50° C.) and/or the secondary mandrel cooling device 234 may be operable to cool the fill product (e.g., as it flows through the mandrel 222) to between two degrees Celsius (2° C.) and twenty degrees Celsius (20° C.). The mandrel cooling circuit may be set to and/or maintained at a first temperature setting by activation and/or setting of the primary mandrel cooling device 224, for example, while activation and/or setting of the secondary mandrel cooling device 234 may cause the mandrel cooling circuit to be set to and/or maintained at a second temperature setting. In some embodiments, the first temperature setting may be higher than the second temperature setting. The first temperature setting may be set at twenty-five degrees Celsius (25° C.) thereby defining a first level of cooling, for example, while the second temperature setting may be set at negative five degrees Celsius (−5° C.), thereby defining a second level of cooling.

According to some embodiments, first and/or second valves 228*a-b* may be provided such that the secondary mandrel cooling device 234 may be selectively bypassed or engaged. In some embodiments, a first temperature sensor 226*a* (e.g., a thermocouple) may be coupled (e.g., between the pump 230 and the filling mandrel array 220 (and/or a cooling inlet "A" thereof), as depicted) to detect a temperature of the filling mandrel array 220 (and/or the mandrels 222 thereof) and/or of an effluent of cooling fluid from the primary mandrel cooling device 224 (e.g., as depicted for purposes of example). According to some embodiments, either or both of the primary mandrel cooling device 224 and the secondary mandrel cooling device 234 may be selectively and/or automatically activated and/or set (e.g., at different settings, operational levels, modes, and/or intensities; by the controller device 212 that may be in communication therewith) based on readings from the first temperature sensor 226*a* (e.g., first temperature readings).

In some embodiments, a second temperature sensor 226*b* (e.g., a thermocouple) may also or alternatively be coupled (e.g., between the filling mandrel array 220 (and/or a cooling outlet "B" thereof) and the primary and/or secondary cooling devices 224, 234, as depicted) to detect a temperature of the filling mandrel array 220 (and/or the mandrels 222 thereof) and/or of an effluent of cooling fluid from filling mandrel array 220 (e.g., as depicted for purposes of example). According to some embodiments, either or both of the primary mandrel cooling device 224 and the secondary mandrel cooling device 234 may be selectively and/or automatically activated and/or set (e.g., at different settings, operational levels, modes, and/or intensities; by the controller device 212) based on readings from the second temperature sensor 226*b* (e.g., second temperature readings). According to some embodiments, the controller device 212 may compare the first and second temperature readings to each other and/or to one or more stored thresholds and/or ranges to determine, identify, and/or compute or calculate one or more component settings (e.g., cooling and/or "extra"-cooling triggers). The controller device 212 may manage and/or control the rotary BFS manufacturing system 200 and/or the BFS manufacturing apparatus 210, for example, such as by receiving readings from the first and/or second temperature sensors 226*a-b* and engaging, disengaging, starting, stopping, and/or bypassing one or more of the cooling devices 204, 224, 234. In some embodiments, the controller device 212 may selectively activate and/or change a setting of one or more of the first and second valves 228*a-b* and/or the pump 230 based on the readings received from the first and/or second temperature sensors 226*a-b*.

According to some embodiments, the rotary BFS manufacturing system 200 and/or the BFS manufacturing apparatus 210 may comprise a rotary BFS mold system 250 that is configured to dynamically rearrange (e.g., in a rotary manner) a plurality of corresponding mold halves 252. While not explicitly detailed in FIG. 2, in rotary BFS systems each respective mold half 252 is typically configured to function both as a primary mold that forms a primary portion of a desired BFS product/receptacle and a secondary mold that seals products formed by the previous mold halves 252 in a rotational sequence. In some embodiments, the rotary BFS manufacturing system 200 may comprise a mold cooling device 254 that is coupled to provide cooling (e.g., remove heat from) the rotary BFS mold system 250 (and/or the mold halves 252 thereof). In some embodiments, the rotary BFS manufacturing system 200 and/or the BFS manufacturing apparatus 210 may comprise a post molding cooling device 264 that, for example, cools (or removes heat from) one or more BFS products 270 as they emerge from the rotary BFS mold system 250. According to some embodiments, the post molding cooling device 264 may comprise a portion of the mandrel cooling circuit (or primary or secondary mandrel cooling circuit) such that the post molding cooling device 264 may be selectively activated, deactivated, and/or set by automatic manipulation of second and/or third valves 228c-d (e.g., by the controller device 212 that may be in communication with the second and/or third valves 228c-d and/or the post molding cooling device 264).

In some embodiments, the engagement and/or setting of one or more of the primary mandrel cooling device 224 and the secondary mandrel cooling device 234 may be managed by the controller device 212 based on an operational status of the rotary BFS manufacturing system 200 and/or the BFS manufacturing apparatus 210 (and/or the rotary BFS mold system 250, the parison head/extruder 220-1, and/or the filling mandrel array 220 thereof). The secondary mandrel cooling device 234 may only be engaged, for example, while the rotary BFS manufacturing system 200 is actively engaged in extruding the parison and/or conducting product molding (e.g., via active operation of the rotary BFS mold system 250). In some embodiments, the first mandrel cooling device 224 may be activated, set, and/or engaged (e.g., by the controller device setting the first and second valves 228a-b) upon engagement of a first stage of a manufacturing cycle of the BFS manufacturing system 200 and/or the BFS manufacturing apparatus 210 and/or the secondary mandrel cooling device 234 may be activated, set, and/or engaged (e.g., by the controller device setting the first and second valves 228a-b) upon engagement of a second stage of the manufacturing cycle of the BFS manufacturing system 200 and/or the BFS manufacturing apparatus 210. According to some embodiments, the second stage of the manufacturing cycle may comprise an engagement of the parison head/extruder 220-1, the rotary mold system 250, and the filling mandrel array 220 in coordination to produce one or more units of the BFS product 270.

While additional cooling e.g., via activation of the secondary mandrel cooling device 234 may provide advantages for the fill product, such additional and/or multi-stage cooling (e.g., "over-cooling" or "extra-cooling") may present or create problems with the functionality of the rotary BFS manufacturing system 200 (e.g., by negatively affecting the characteristics of the BFS product 270). In some cases, one problem may be that over-cooling (e.g., achieving fill product temperatures below about eighteen degrees Celsius (18° C.)) of the fill product may reduce the temperature of the filling mandrel 222 and/or the parison itself to levels that are disruptive to the BFS manufacturing process. Dropping the temperature of the mandrel(s) 222 too low may cause failure of components thereof (e.g., seals, disks, O-rings, etc.; not separately shown) and dropping the temperature of the plastic resin/parison too low may negatively affect the molding process and result in poor characteristics (e.g., mottling, brittleness) and/or failure of the BFS product 270 (e.g., splitting, cracking, leaking).

Accordingly, in some embodiments the cooling of the fill product to temperatures below eighteen degrees Celsius (18° C.) via one or more of the primary mandrel cooling device 224 and the secondary mandrel cooling device 234 may be selectively conducted only during certain stages, phases, and/or modes of operation of the rotary BFS manufacturing system 200 and/or the BFS manufacturing apparatus 210, such as during and/or at the initiation of/engagement of extrusion of the resin or filling of the molded vials/containers. In some embodiments, once the extrusion process or filling process (and/or other triggering mode, process, etc.) ceases, the controller may automatically shut off, bypass (e.g., by activating one or more of the valves 228a-d), and/or disengage one or more of the product cooling device 204, the primary mandrel cooling device 224, the secondary mandrel cooling device 234, the mold cooling device 254, and/or the post molding cooling device 264. According to some embodiments, the engaging, disengaging, and/or setting (and/or re-setting) of the cooling devices 204, 224, 234, 254, 264 may be conducted (e.g., by the controller device 212) in an iterative and/or repetitive pattern or cycle. In the case that the manufacturing cycle is cyclical, for example, the controller device 212 may automatically engage, disengage, and/or set (and/or adjust) any or all of the cooling devices 204, 224, 234, 254, 264 each time a triggering portion of the manufacturing cycle occurs. According to some embodiments, the BFS manufacturing apparatus 210 and/or the controller device 212 may comprise and/or be in communication with one or more input devices (not shown) such as buttons, interface elements, and/or switches. In some embodiments, indications of the manufacturing cycle stage and/or engagement of various components may be automatically determined and/or identified (e.g., via signals received from the various components) and/or may be indicated by input received from the one or more input devices. In some embodiments, the various levels of cooling and/or temperature settings may be may be automatically set or defined based on stored instructions, thresholds, and/or logic and/or may be defined based on input received via the one or more input devices.

In some embodiments, the controller device 212 may be programmed to automatically adjust settings of the rotary BFS manufacturing system 200 to compensate for the over-cooling of the fill product. The flow of the plastic resin/parison may be adjusted (e.g., increased) during periods of over-cooling to maintain desired parison flow and/or extrusion characteristics, for example, and/or a temperature of the mold halves 252 (e.g., at least partially controlled by the mold cooling device 254) may be adjusted (e.g., increased) to maintain desired molding characteristics. If either the parison or the mold halves 252 are reduced in temperature below certain thresholds, for example, the BFS products 270 formed by the rotary BFS manufacturing system 200 may be of undesirably quality (e.g., mottled plastic appearance, malformed molded portions, etc.). According to some embodiments, utilizing the first temperature sensor 226a (and/or the second temperature sensor 226b) the controller device 212 may automatically adjust settings of the primary mandrel cooling device 224, the secondary mandrel cooling device 234, the product cooling device 204, the rotary BFS mold system 252, and/or the mold cooling device 254 to maintain a proper temperature balance of the fill product, the resin/parison, and/or mold halves 252.

In some embodiments, any or all of the cooling devices 204, 224, 234, 254, 264 may comprise one or more heat exchangers, radiators, heat sinks, heat pipes, chillers, air knives, pipes, tubes, valves 228a-d, and/or fittings. According to some embodiments, any or all of the cooling devices 204, 224, 234, 254, 264 may comprise one or more heating devices such as electrically resistive coils, catalytic heaters, and/or light-based heating elements. In other words, in some embodiments any or all of the cooling devices 204, 224, 234, 254, 264 may function as cooling and/or heating devices (e.g., any type or configuration of devices that manages and/or controls temperature). In some embodiments, only the primary mandrel cooling device 224 may be utilized to achieve desired over-cooling (e.g., a single-stage cooling process).

According to some embodiments, such as in the case that an existing rotary BFS manufacturing machine (not separately shown) may be retrofitted to achieve over-cooling, various modifications to the existing machine may be made. Cooling system plumbing may be rerouted and/or controlled by the valves 228a-d, for example, and/or the temperature sensors 226a-b may be advantageously coupled to a desired portion of the machine and electronically interfaced with the existing control system. In some embodiments, existing components (not shown) such as a minimum cooling water thermostat (and/or the control logic associated therewith) may be disabled and/or bypassed—e.g., to permit over-cooling. According to some embodiments, the cooling fluid of an existing machine may be changed to a different type of fluid. Typical BFS machines employ an anti-microbial aqueous cooling solution, for example, which works well in the typical operating temperature range of twenty degrees Celsius (20° C.) to fifty degrees Celsius (50° C.). With the added ability to extra-cool to temperatures below freezing, however, the typical cooling liquid may freeze, damaging components and/or reducing the effectiveness of the cooling circuit. Accordingly, glycol and/or another fluid with a freeze point well below the freeze point of water may be substituted for the standard cooling liquid in some embodiments. According to some embodiments, the pump 230 may comprise and/or be coupled to various flow devices such as an orifice (not separately shown) that are sized and/or configured for a particular type of cooling fluid. In some embodiments, one or more of these flow devices such as the orifice may be substituted with a flow device (e.g., an orifice) that is configured for the substituted cooling fluid. While a typical flow orifice may comprise a flow passage of approximately two and one half millimeters (2.5-mm) in diameter, for example, in some embodiments the typical flow orifice may be replaced with a larger flow passage of approximately three millimeters (3.0-mm) in diameter.

Fewer or more components 202, 204, 210, 212, 220, 220-1, 222, 224, 226a-b, 228a-d, 230, 234, 250, 252, 254, 264, 270 and/or various configurations of the depicted components 202, 204, 210, 212, 220, 220-1, 222, 224, 226a-b, 228a-d, 230, 234, 250, 252, 254, 264, 270 may be included in the BFS manufacturing system 200 without deviating from the scope of embodiments described herein. In some embodiments, the components 202, 204, 210, 212, 220, 220-1, 222, 224, 226a-b, 228a-d, 230, 234, 250, 252, 254, 264, 270 may be similar in configuration and/or functionality to similarly named and/or numbered components as described herein. In some embodiments, the BFS manufacturing system 200 (and/or portion thereof) may comprise a dynamically-cooled rotary BFS manufacturing system programmed and/or otherwise configured to execute, conduct, and/or facilitate one or more methods (e.g., the method 400 of FIG. 4 herein) for selective and/or dynamic BFS cooling, as described herein. In some embodiments, and as depicted by the multiple dotted lines emanating from the controller device 212 in FIG. 2, the controller device 212 may be coupled to and/or be in communication with any or all of the other components 202, 204, 210, 220, 220-1, 222, 224, 226a-b, 228a-d, 230, 234, 250, 252, 254, 264 of the BFS manufacturing system 200.

III. Rotary BFS Cooling Tests

Figure 3A:
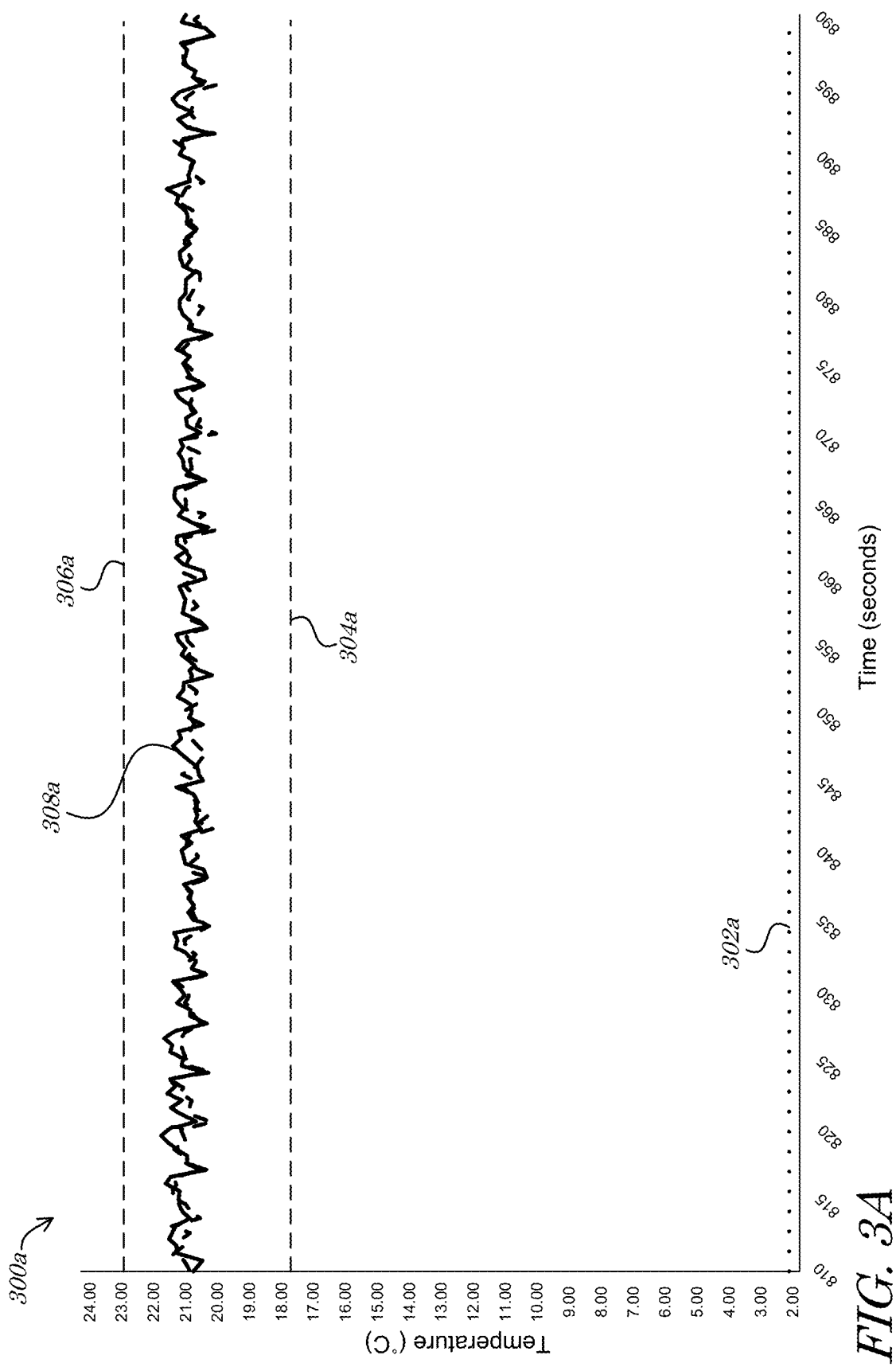
FIG. 3A, FIG. 3B, and FIG. 3C are graphs showing results from cooling tests for a rotary BFS manufacturing system according to some embodiments.
Figure 3B:
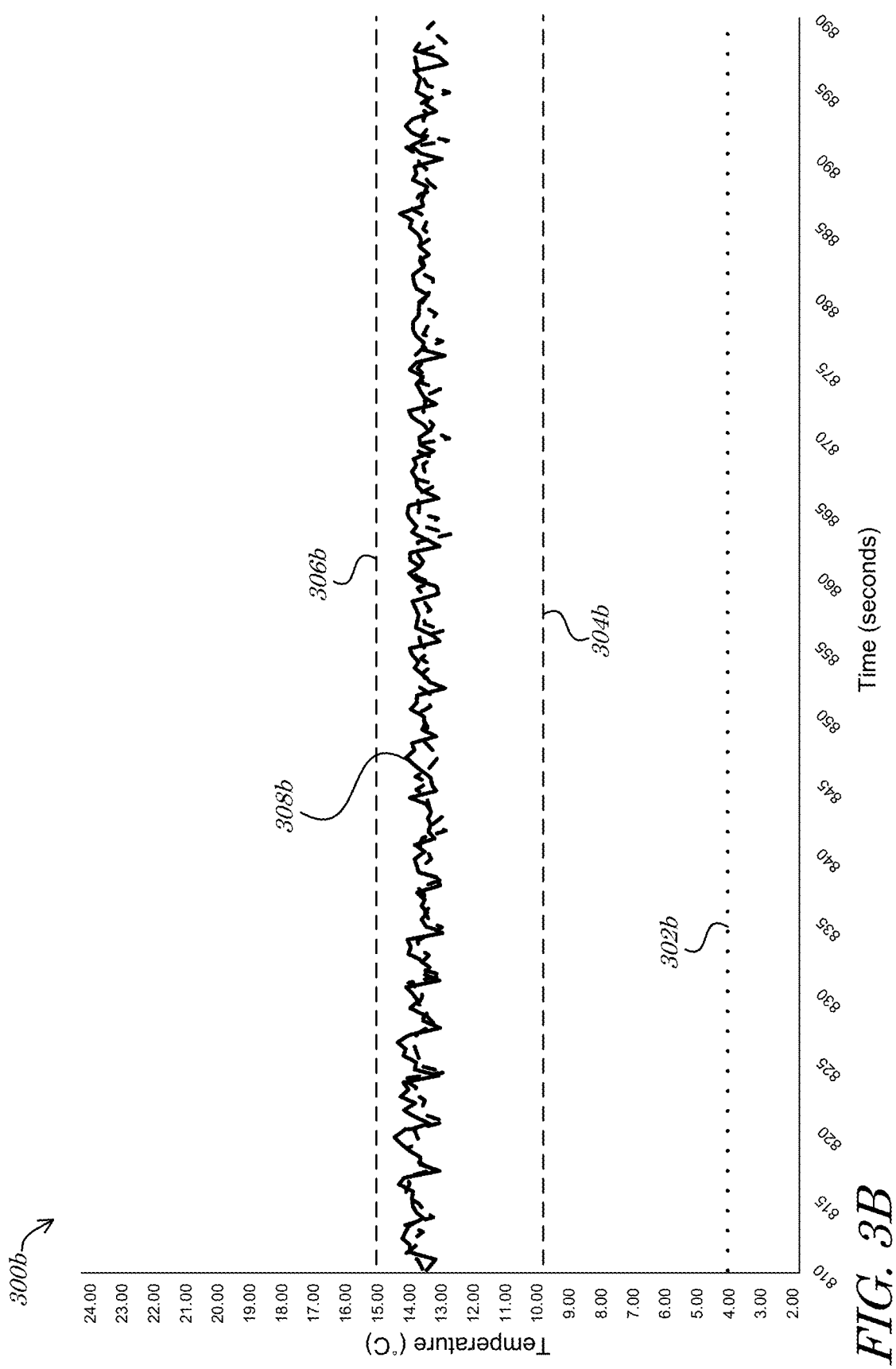
Figure 3C:
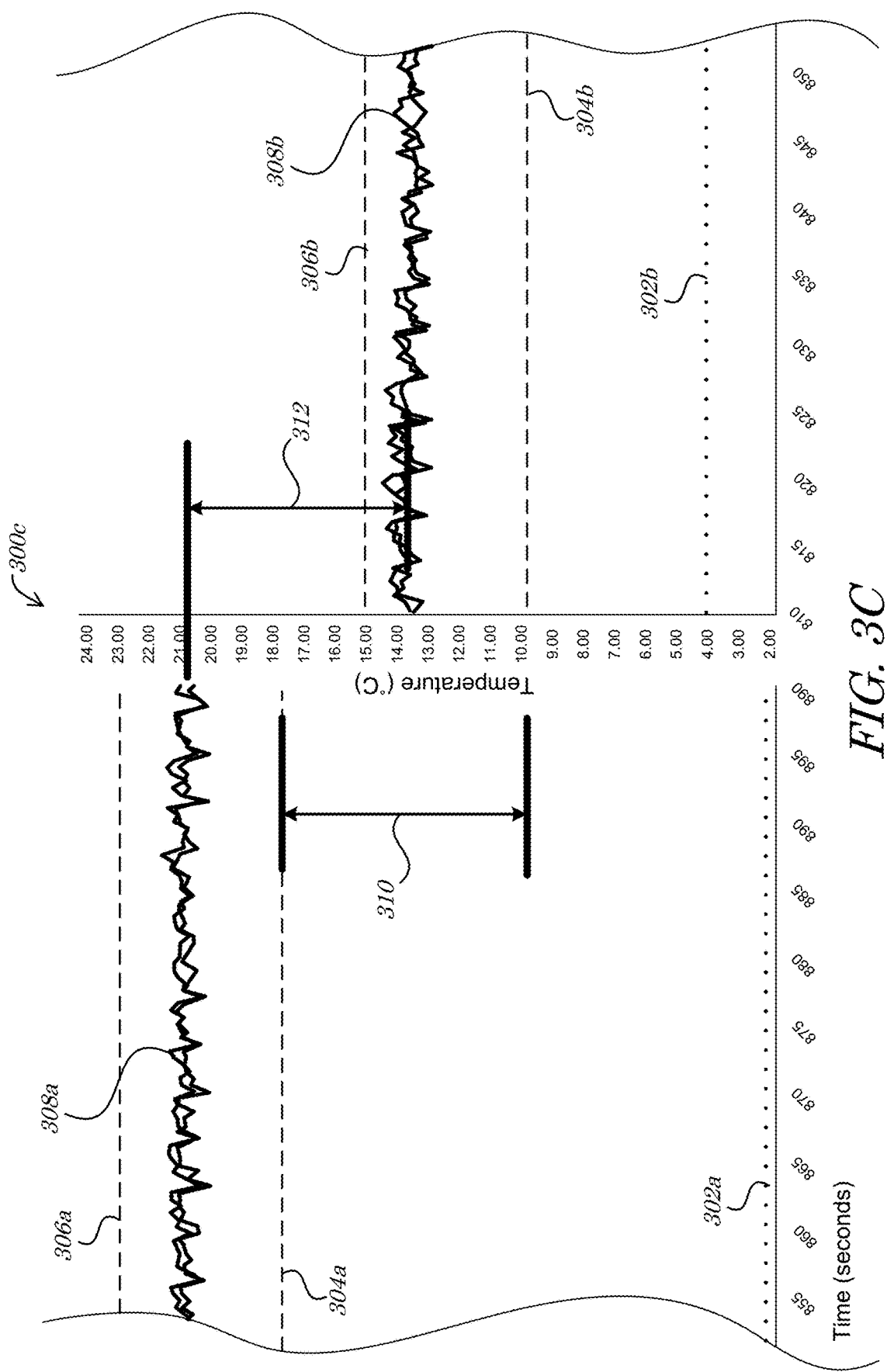

Referring to FIG. 3A, FIG. 3B, and FIG. 3C, graphs 300a-c showing results from cooling tests for a rotary BFS manufacturing system according to some embodiments are shown. There are various possible cooling strategies for rotary BFS machines. Namely, (i) cool the fill product, (ii) cool the molds, (iii) cool the BFS product after sealing, and/or (iv) cool the mandrels. Each strategy has attendant positive and negative effects. The strategy with the fewest discernable negative effects is to cool the fill product. This was attempted as depicted in the first results of FIG. 3A as plotted on a first graph 300a having an x-axis of time (in seconds) and a y-axis of temperature (in degrees Celsius). With a desired/target fill product final temperature of less than eighteen degrees Celsius (18° C.), the fill product was chilled to two degrees Celsius (2° C.), graphed as a first constant product input (e.g., input into filling mandrels) temperature line (dotted) 302a, and the mandrels were set such that a cooling fluid inflow was eighteen degrees Celsius (18° C.), graphed as a first constant mandrel inflow line (dashed) 304a. As depicted in the first results of FIG. 3A, the cooling fluid output from the mandrels was estimated to be twenty-three degrees Celsius (23° C.), graphed as a first constant mandrel outflow line (dashed) 306a, and the measured temperature (measured at a plurality of the mandrels) of the product coming out of the mandrels (e.g., that would be utilized to fill molded BFS containers during production) ranged between about twenty degrees Celsius (20° C.) and twenty-two degrees Celsius (22° C.), graphed as a first product output (e.g., output from the filling mandrels) temperature line 308a. Accordingly, the setting/adjustment of the fill product temperature had little effect on the fill product output temperature, which remained at approximately an average of twenty-one degrees Celsius (21° C.). Reducing the mold temperature was attempted as well (not shown), but had little overall effect on the fill product out temperature and also negatively affected the molding process (poor BFS product quality was observed).

In FIG. 3B, a second graph 300b shows that the fill product temperature was increased to four degrees Celsius (4° C.), graphed as a second constant product input (e.g., input into filling mandrels) temperature line (dotted) 302b, but the mandrels were cooled with an input cooling level of ten degrees Celsius (10° C.), graphed as a second constant mandrel inflow line (dashed) 304b. As depicted in FIG. 3B, the cooling fluid output from the mandrels was estimated to be fifteen degrees Celsius (15° C.), graphed as a second constant mandrel outflow line (dashed) 306b, and the measured temperature (measured at a plurality of the mandrels) of the product coming out of the mandrels (e.g., that would be utilized to fill molded BFS containers during production) ranged between about thirteen degrees Celsius (13° C.) and fourteen and one half degrees Celsius (14.5° C.), graphed as a second product output (e.g., output from the filling mandrels) temperature line 308b. Accordingly, the fill product output temperature dropped significantly to about fourteen degrees Celsius (14° C.). As depicted in FIG. 3C, which is a side-by-side comparison graph 300c of the two exemplary tests, an eight degree Celsius (8° C.) drop in mandrel cooling 310 yielded a seven degree Celsius (7° C.) drop in the fill product out temperature 312. In light of these results, in some embodiments a desired product temperature of zero degrees Celsius (0° C.) may be achieved by over-cooling the mandrel of a rotary BFS machine another sixteen degrees Celsius (16° C.) to an inlet mandrel cooling temperature of approximately negative six degrees Celsius (−6° C.). According to some embodiments, also decreasing the fill product temperature, such as down to two degrees Celsius (2° C.) (as in the first test of FIG. 3A) may reduce the requirement for the mandrel cooling input (e.g., to between negative three degrees Celsius (−3° C.) and negative five degrees Celsius (−5° C.)).

According to some embodiments, the settings of the cooling systems of a rotary BFS manufacturing system may be set/programmed to reduce the mandrel temperature (and the fill product temperature) to achieve a desired over-cooling of the fill product as-filled in the BFS vials/products. In some embodiments, the control system may be further programmed to (i) automatically engage and disengage the over-cooling based on a cycle, mode, and/or other status of the rotary BFS machine, (ii) automatically adjust the resin/parison flow rate to achieve a consistent flow/volume of material being extruded at the lower temperatures, and/or (iii) automatically adjust the temperature of the molds to achieve a desired tare weight and/or consistency of the molded products in light of the lower temperatures. In such a manner, for example, the typically heat-intensive BFS manufacture technique may be utilized to produce BFS products filled with more temperature sensitive fill products (e.g., temperature sensitive vaccines that must be maintained below a certain maximum temperature threshold) by selective and/or intermittent filling mandrel cooling without adversely affecting the quality of the BFS products.

IV. Dynamically-Cooled BFS Manufacturing Methods

Figure 4:
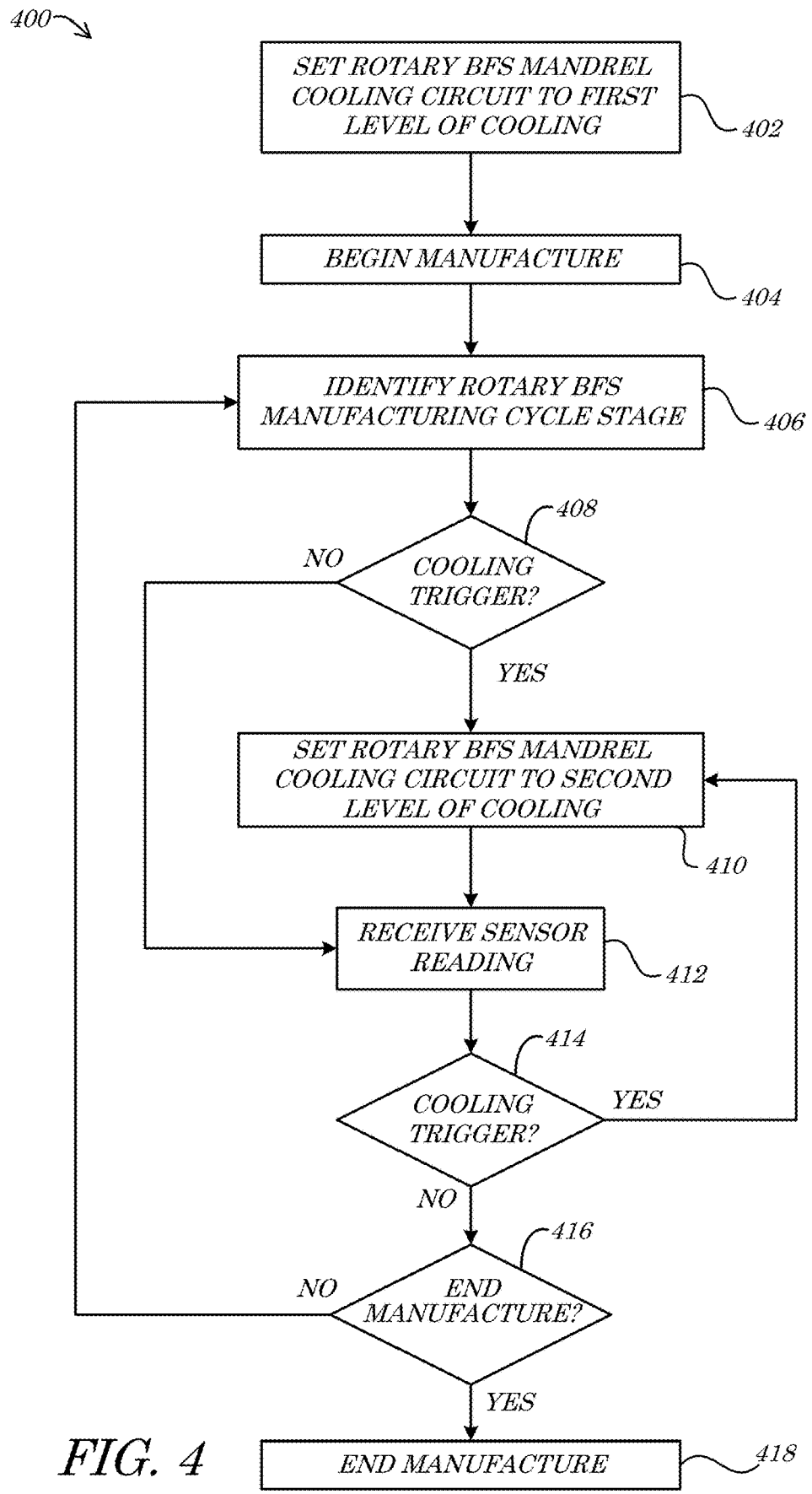
FIG. 4 is a flow diagram of a method according to some embodiments.

Referring now to FIG. 4, a flow diagram of a method 400 according to some embodiments are shown. In some embodiments, the method 400 may be performed and/or implemented by and/or otherwise associated with one or more specialized and/or specially-programmed computers (e.g., one or more of the BFS manufacturing apparatus 110, 210, and/or the apparatus 510 of FIG. 1, FIG. 2, and/or FIG. 5 herein), computer terminals, computer servers, computer systems and/or networks, and/or any combinations thereof (e.g., by one or more multi-threaded and/or multi-core processing units of a dynamically-cooled BFS manufacturing system). In some embodiments, the method 400 may be embodied in, facilitated by, and/or otherwise associated with various input mechanisms and/or interfaces (such as the interface 536 of FIG. 5 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 540, 640a-e of FIG. 1, FIG. 5, FIG. 6A, FIG. 6B, FIG. 6C, FIG. 6D, and/or FIG. 6E herein) may store thereon instructions that when executed by a machine (such as a computerized processor) result in performance according to any one or more of the embodiments described herein.

In some embodiments, the method 400 may comprise setting (e.g., by a processing device) a rotary BFS mandrel cooling circuit to a first level of cooling, at 402. A controller device of a BFS manufacturing machine or apparatus may, for example, energize one or more electrical components such as pumps, valves, switches, and/or compressors to circulate a cooling fluid throughout a mandrel cooling circuit that is configured to cool and/or remove heat from one or more filling mandrels of the BFS machine. According to some embodiments, the first level of cooling may be defined automatically such as be querying stored instructions and/or may be defined at least in part based on input received via an input device such as a knob, switch, and/or graphical interface input element. According to some embodiments, the first level of cooling may be set before, during, or after various stages of activation and/or operation of the BFS machine. In some embodiments, the setting and/or activation of the mandrel cooling circuit may be conducted in coordination with other BFS machine operations such as parison head/extruder heating and/or other cooling circuit settings and/or operations. In some embodiments, the mandrel cooling circuit may comprise a first or primary cooling circuit in communication with a filling mandrel and/or filling mandrel array and/or the setting may also or alternatively comprise setting and/or activating one or more other cooling circuits. In some embodiments, as utilized for purposes of ongoing example herein, the setting may comprise setting a primary mandrel cooling circuit to between eighteen degrees Celsius (18° C.) and twenty-five degrees Celsius (25° C.).

According to some embodiments, the method 400 may comprise beginning (e.g., by the processing device) a rotary BFS manufacture process, at 404. To produce one or more units of a BFS product such as a pre-filled medicine/vaccine vial or bottle, for example, the BFS machine may be powered-on, have one or more settings confirmed, defined, and/or adjusted, and/or may have one or more components activated and/or engaged. In some embodiments, the BFS machine may begin the rotary BFS manufacture process by engaging (e.g., by a controller device and/or executing stored process instructions) a parison head and/or extruder (e.g., to melt plastic resin and produce a plastic parison), a rotary mold system (e.g., that operates upon the plastic parison to form and seal BFS vials/containers), and/or the filling mandrel/filling mandrel array (e.g., with a filling mandrel for each cavity of the mold to be filled). These (and/or other) BFS machine components may be engaged in coordination, for example, to produce a plurality of units of prefilled BFS containers. In some embodiments, the rotary BFS manufacture process may begin with a first stage and may progress through a plurality of other stages of manufacture. According to some embodiments, the beginning of the rotary BFS manufacture process may comprise a first stage that triggers and/or utilizes the first level of cooling (e.g., set at 402).

In some embodiments, the method 400 may comprise identifying (e.g., by the processing device) a stage of the rotary BFS manufacture process, at 406. After the rotary BFS manufacture process begins (e.g., at 404; utilizing the first level of cooling) and progresses through various manufacturing stages, for example, the method 400 may monitor, query, and/or be notified of manufacturing process changes. According to some embodiments, each change from one manufacturing stage or process to another may trigger a signaling that notifies the controller device of the change and/or transition. In some embodiments, such as where the controller device actively causes the transitions, the controller device may update a stored indication of the manufacturing process status such as by defining a stored flag and/or activating a particular electrical circuit, indicator, etc. In some embodiments, different stages of the rotary BFS manufacture process may be identified based on input received (e.g., from a machine operator) and/or from another manufacturing device in communication with the BFS machine (e.g., a packaging machine, material supply machine, etc.).

According to some embodiments, the method 400 may comprise determining (e.g., by the processing device) whether a cooling trigger has occurred, at 408. In some embodiments, the BFS machine may be operated solely at the first level of cooling. According to other embodiments, the first level of cooling may be triggered and/or caused to change in response to one or more events and/or actions. In the case that the BFS machine has initiated and/or entered into a second stage of the rotary BFS manufacture process, for example, it may be desirably to dynamically change the cooling level. According to some embodiments, rotary BFS manufacture process stage information (e.g., identified and/or received at 406) may be compared to stored instructions, rules, and/or data (e.g., matching criteria, numerical range criteria, and/or numerical threshold criteria) to determine whether a matching condition exists. In the case that the cooling level is pre-set to automatically change upon initiation of a particular stage (e.g., a second stage) of the rotary BFS manufacture process, for example, data descriptive of the current stage of the process may be compared to stored data identifying the triggering/second stage to determine whether the triggering/second stage has begun and/or is currently underway (e.g., based on whether the stored information matches the query information). In some embodiments, cooling trigger information may also or alternatively be received via one or more input devices (e.g., from a machine operator). According to some embodiments, received input may either be compared to stored trigger matching, range, and/or threshold criteria to determine whether a triggering condition exists or may be received as an indication of the triggering condition (e.g., the operator may trigger a cooling level change irrespective of pre-defined trigger conditions, in some embodiments).

In some embodiments, in the case that it is determined that a cooling trigger has occurred (e.g., at 408), the method 400 may comprise and/or continue to setting (e.g., by the processing device) the rotary BFS mandrel cooling circuit to a second level of cooling, at 410. The controller device of the BFS manufacturing machine or apparatus may, for example, energize one or more electrical components such as pumps, valves, switches, and/or compressors to circulate the cooling fluid throughout the mandrel cooling circuit in a manner that changes the level of cooling (e.g., to the second level of cooling). According to some embodiments, the second level of cooling may be defined automatically such as be querying stored instructions and/or may be defined at least in part based on input received via an input device such as a knob, switch, and/or graphical interface input element. According to some embodiments, the setting and/or activation of the mandrel cooling circuit may be conducted in coordination with other BFS machine operations such as parison head/extruder heating and/or other cooling circuit settings and/or operations. In some embodiments, the mandrel cooling circuit may comprise the first or primary cooling circuit in communication with the filling mandrel and/or filling mandrel array and/or the setting may also or alternatively comprise setting and/or activating one or more other cooling circuits. The BFS machine may comprise and/or define, for example, both the first or primary mandrel cooling circuit and a second or secondary mandrel cooling circuit that may be separately and/or independently set, activated, and/or controlled. According to some embodiments, the second level of cooling may be achieved by changing the setting of the primary mandrel cooling circuit to a different temperature than is utilized for the first level of cooling. While the first level of cooling, as utilized for purposes of ongoing example herein, may comprise setting the primary mandrel cooling circuit to between eighteen degrees Celsius (18° C.) and twenty-five degrees Celsius (25° C.), for example, the second level of cooling may comprise re-setting the primary mandrel cooling circuit to between negative six degrees Celsius (−6.0° C.) and eighteen degrees Celsius (18° C.).

According to some embodiments, the second level of cooling may be achieved by changing the setting of the secondary mandrel cooling circuit to a particular temperature and/or activating the secondary mandrel cooling circuit (e.g., by opening and/or adjusting one or more valves, e.g., between the two cooling circuits). In some embodiments, the secondary mandrel cooling circuit may be maintained at the second level of cooling and/or at a particular setting that is below the first level of cooling set point, for example, and activation of the secondary mandrel cooling circuit may comprise introducing the (e.g., extra-chilled) cooling fluid from the secondary mandrel cooling circuit into the primary cooling circuit. In such a manner, for example, the overall cooling fluid temperature (and/or the temperature within the primary mandrel cooling circuit) may be selectively and quickly changed by the introducing of the different temperature cooling fluid from the secondary cooling fluid circuit. According to some embodiments, the cooling fluid temperature of the secondary mandrel cooling circuit may be maintained at a substantially lower temperature than that of the primary mandrel cooling circuit. While the first level of cooling, as utilized for purposes of ongoing example herein, may comprise setting the primary mandrel cooling circuit to between eighteen degrees Celsius (18° C.) and twenty-five degrees Celsius (25° C.), for example, the second level of cooling may comprise introducing cooling fluid from the secondary mandrel cooling circuit into the primary mandrel cooling circuit where the introduced cooling fluid is maintained between negative six degrees Celsius (−6.0° C.) and eighteen degrees Celsius (18° C.).

According to some embodiments, the method 400 may comprise receiving (e.g., by the processing device) a sensor reading, at 412. In some embodiments, in the case that it is determined that a cooling trigger has not occurred (e.g., at 408) and/or after the setting of the rotary BFS mandrel cooling circuit to the second level of cooling (e.g., at 410), data descriptive of the rotary BFS manufacturing process may be received from one or more sensors. The controller device may monitor one or more temperature sensors, for example, to identify one or more temperature readings within the BFS machine and/or within or at certain portions of the cooling circuit(s). According to some embodiments, a plurality of sensor readings may be received and/or obtained, e.g., from a plurality of sensors and/or at a plurality of different times.

In some embodiments, the method 400 may comprise determining (e.g., by the processing device) whether a cooling (e.g., extra-cooling) trigger has occurred, at 414. According to some embodiments, the first and/or second levels of cooling may be triggered and/or caused to change in response to one or more events and/or actions, e.g., based on and/or in response to the receiving of the sensor reading(s) at 412. In the case that one or more sensor readings meet or exceed a predefined criterion, for example, it may be desirably to dynamically change the cooling level, e.g., of one or more of a primary and/or secondary mandrel cooling circuit. According to some embodiments, sensor data (e.g., identified and/or received at 412) may be compared to stored instructions, rules, and/or data (e.g., matching criteria, numerical range criteria, and/or numerical threshold criteria) to determine whether a matching condition exists. In the case that the cooling level is pre-set to automatically change upon identification of certain temperature (or other sensor) threshold being reached or exceeded, for example, data descriptive of the received temperature reading may be compared to stored data identifying the triggering/temperature threshold to determine whether the triggering/temperature threshold has been met or exceeded (e.g., based on whether the stored information matches the received/query information). In some embodiments, cooling trigger information may also or alternatively be received via one or more input devices (e.g., from a machine operator). According to some embodiments, received input may either be compared to stored trigger matching, range, and/or threshold criteria to determine whether a triggering condition exists or may be received as an indication of the triggering condition (e.g., the operator may trigger a cooling level change irrespective of pre-defined trigger conditions, in some embodiments). According to some embodiments, multiple different sensor and/or temperature readings (e.g., first and second sensor and/or temperature readings) may also or alternatively be compared to each other to identify a cooling/extra-cooling trigger condition. In some embodiments, the thresholds, criteria, and/or rules or logic may be based on rotary BFS manufacturing process data (e.g., stage data identified at 406). Different sensor and/or temperature thresholds and/or criteria may be stored for and/or related to, for example, different stages of the rotary BFS manufacturing process.

In some embodiments, in the case that it is determined that a cooling trigger has occurred (e.g., at 414), the method 400 may comprise and/or continue back to setting the rotary BFS mandrel cooling circuit to the second level of cooling, at 410. While the term "second level of cooling" is utilized for convenience of description, it may refer to any level of cooling that is subsequent to and/or different than the first level of cooling, in some embodiments. Similarly, in the case that a sensor-based cooling trigger is identified and triggers a cooling level change at 414 and the second level of cooling has already been defined and/or set at 410, subsequent applications of the cooling level setting at 410 may comprise, e.g., setting and/or defining a third, fourth, and/or "n"-th level of cooling.

In some embodiments, the method 400 may comprise determining (e.g., by the processing device) whether to end the manufacture, at 416. In the case that one or more desired BFS product units have not yet been manufactured, for example, the method 400 may proceed back to identifying (e.g., by the processing device) a stage of the rotary BFS manufacture process, at 406. In the case that all desired BFS product units have been manufactured, the method 400 may comprise and/or continue to ending the rotary BFS manufacture process, at 418. According to some embodiments, manufacturing end information may also or alternatively be received via one or more input devices (e.g., from a machine operator). According to some embodiments, received input may either be compared to stored manufacturing end trigger matching, range, and/or threshold criteria to determine whether manufacturing should be ended or may be received as an indication of the end of manufacture (e.g., the operator may trigger an end to the manufacture irrespective of pre-defined trigger conditions and/or settings, in some embodiments).

V. Dynamically-Cooled BFS Manufacturing Apparatus and Articles of Manufacture Turning to FIG. 5, a block diagram of an apparatus 510 according to some embodiments is shown. In some embodiments, the apparatus 510 may be similar in configuration and/or functionality to one or more of the one or more of the BFS manufacturing apparatus 110, 210 of FIG. 1 and/or FIG. 2 herein. The apparatus 510 may, for example, execute, process, facilitate, and/or otherwise be associated with the method 400 of FIG. 4 herein, and/or portions thereof. In some embodiments, the apparatus 510 may comprise a processing device 512, a communication device 514, an input device 516, an output device 518, a cooling device 534, an interface 536, and/or a memory device 540 (storing various programs and/or instructions 542 and data 544). According to some embodiments, any or all of the components 512, 514, 516, 518, 534, 536, 540, 542, 544 of the apparatus 510 may be similar in configuration and/or functionality to any similarly named and/or numbered components described herein. Fewer or more components 512, 514, 516, 518, 534, 536, 540, 542, 544 and/or various configurations of the components 512, 514, 516, 518, 534, 536, 540, 542, 544 may be included in the apparatus 510 without deviating from the scope of embodiments described herein.

According to some embodiments, the processor 512 may be or include any type, quantity, and/or configuration of processor that is or becomes known. The processor 512 may comprise, for example, an Intel® IXP 2800 network processor or an Intel® XEON™ Processor coupled with an Intel® E8501 chipset. In some embodiments, the processor 512 may comprise multiple interconnected processors, microprocessors, and/or micro-engines. According to some embodiments, the processor 512 (and/or the apparatus 510 and/or other components thereof) may be supplied power via a power supply (e.g., an input device 516), such as a battery, an AC source, a DC source, an AC/DC adapter, solar cells, and/or a generator. In the case that the apparatus 510 comprises a controller or server, such as a blade server, necessary power may be supplied via an AC outlet, power strip, surge protector, and/or Uninterruptible Power Supply (UPS) device.

In some embodiments, the communication device 514 may comprise any type or configuration of communication device that is or becomes known or practicable. The communication device 514 may, for example, comprise a Bluetooth® Low Energy (BLE) and/or RF receiver, Network Interface Card (NIC), a telephonic device, a cellular network device, a router, a hub, a modem, a valve and/or conduit (e.g., in the case of fluid communication), and/or a communications bus, port, or cable. According to some embodiments, the communication device 514 may be coupled to the processor 512. In some embodiments, the communication device 514 may comprise an InfraRed (IR), RF, Bluetooth™, Near-Field Communication (NFC), and/or Wi-Fi® network device coupled to facilitate communications between the processor 512 and another device (such as a remote user device and/or manufacturing and/or packaging equipment, not separately shown in FIG. 5).

In some embodiments, the input device 516 and/or the output device 518 are communicatively coupled to the processor 512 (e.g., via wired and/or wireless connections and/or pathways) and they may generally comprise any types or configurations of input and output components and/or devices that are or become known, respectively. The input device 516 may comprise, for example, a keyboard that allows an operator of the apparatus 510 to interface with the apparatus 510 (e.g., by a BFS machine operator). In some embodiments, the input device 516 may comprise a sensor, such as a camera, sound, light, temperature, and/or proximity sensor, configured to capture data of an environment in and/or around the apparatus 510 and report measured values (e.g., sensor data) via signals to the apparatus 510 and/or the processor 512. According to some embodiments, the input device 516 may comprise one or more material supply devices and/or conduits such as plastic resin, cooling fluid (e.g., liquid and/or gas), and/or power supply/inputs. The output device 518 may, according to some embodiments, comprise a display screen, a BFS molding and/or BFS product conveying and/or dispensing unit, and/or other practicable output component and/or device. The output device 518 may, for example, provide an interface (such as the interface 536) via which functionality for dynamic rotary BFS cooling/extra-cooling processes is provided to a user (e.g., via a GUI, website, and/or mobile device application). According to some embodiments, the input device 516 and/or the output device 518 may comprise and/or be embodied in a single device, such as a touch-screen monitor.

The memory device 540 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 540 may, according to some embodiments, store one or more of rotary BFS manufacturing instructions 542-1, cooling instructions 542-2, interface instructions 542-3, manufacturing data 544-1, BFS product data 544-2, and/or sensor data 544-3. In some embodiments, the BFS manufacturing instructions 542-1, cooling instructions 542-2, interface instructions 542-3, manufacturing data 544-1, BFS product data 544-2, and/or sensor data 544-3 may be utilized by the processor 512 to provide output information via the output device 518 and/or the communication device 514.

According to some embodiments, the BFS manufacturing instructions 542-1 may be operable to cause the processor 512 to process the manufacturing data 544-1, BFS product data 544-2, and/or sensor data 544-3 in accordance with embodiments as described herein. Manufacturing data 544-1, BFS product data 544-2, and/or sensor data 544-3 received via the input device 516 and/or the communication device 514 may, for example, be analyzed, sorted, filtered, decoded, decompressed, ranked, scored, plotted, and/or otherwise processed by the processor 512 in accordance with the BFS manufacturing instructions 542-1. In some embodiments, manufacturing data 544-1, BFS product data 544-2, and/or sensor data 544-3 may be fed by the processor 512 through one or more mathematical and/or statistical formulas and/or models in accordance with the BFS manufacturing instructions 542-1 to operate the apparatus 510 as a rotary BFS manufacturing machine (e.g., by conducting one or more stages or portions of a rotary BFS manufacturing process), as described herein.

In some embodiments, the cooling instructions 542-2 may be operable to cause the processor 512 to process the manufacturing data 544-1, BFS product data 544-2, and/or sensor data 544-3 in accordance with embodiments as described herein. Manufacturing data 544-1, BFS product data 544-2, and/or sensor data 544-3 received via the input device 516 and/or the communication device 514 may, for example, be analyzed, sorted, filtered, decoded, decompressed, ranked, scored, plotted, and/or otherwise processed by the processor 512 in accordance with the cooling instructions 542-2. In some embodiments, manufacturing data 544-1, BFS product data 544-2, and/or sensor data 544-3 may be fed by the processor 512 through one or more mathematical and/or statistical formulas and/or models in accordance with the cooling instructions 542-2 to dynamically provide cooling and/or extra-cooling (e.g., via the cooling device 534) to the apparatus 510 (and/or a separate BFS machine, not shown), as described herein.

According to some embodiments, the interface instructions 542-3 may be operable to cause the processor 512 to process the manufacturing data 544-1, BFS product data 544-2, and/or sensor data 544-3 in accordance with embodiments as described herein. Manufacturing data 544-1, BFS product data 544-2, and/or sensor data 544-3 received via the input device 516 and/or the communication device 514 may, for example, be analyzed, sorted, filtered, decoded, decompressed, ranked, scored, plotted, and/or otherwise processed by the processor 512 in accordance with the interface instructions 542-3. In some embodiments, manufacturing data 544-1, BFS product data 544-2, and/or sensor data 544-3 may be fed by the processor 512 through one or more mathematical and/or statistical formulas and/or models in accordance with the interface instructions 542-3 to provide a dynamic rotary BFS cooling interface (e.g., the interface 536), as described herein.

According to some embodiments, the apparatus 510 may comprise the cooling device 534. According to some embodiments, the cooling device 534 may be coupled (physically, thermally, and/or electrically) to the processor 512 and/or to the memory device 540. The cooling device 534 may, for example, comprise a chiller, fan, heat sink, heat pipe, radiator, cold plate, air knife, and/or other cooling component or device or combinations thereof, configured to remove heat from (and/or cool) portions or components of the apparatus 510. In some embodiments, the cooling device 534 may comprise and/or define one or more cooling circuits and/or cooling devices such a chillers. The cooling device 534 may comprise, for example, a primary cooling circuit with a primary chiller/chilling unit and a secondary cooling circuit with a secondary chiller/chilling unit. According to some embodiments, the cooling device 534 may be specifically coupled and/or placed in communication and/or disposed to cool/remove heat from specific components of the apparatus 510 such as a BFS filling mandrel array (not separately shown).

Any or all of the exemplary instructions and data types described herein and other practicable types of data may be stored in any number, type, and/or configuration of memory devices that is or becomes known. The memory device 540 may, for example, comprise one or more data tables or files, databases, table spaces, registers, and/or other storage structures. In some embodiments, multiple databases and/or storage structures (and/or multiple memory devices 540) may be utilized to store information associated with the apparatus 510. According to some embodiments, the memory device 540 may be incorporated into and/or otherwise coupled to the apparatus 510 (e.g., as shown) or may simply be accessible to the apparatus 510 (e.g., externally located and/or situated).

Referring to FIG. 6A, FIG. 6B, FIG. 6C, FIG. 6D, and FIG. 6E, perspective diagrams of exemplary data storage devices 640*a-e* according to some embodiments are shown.

Figure 5:
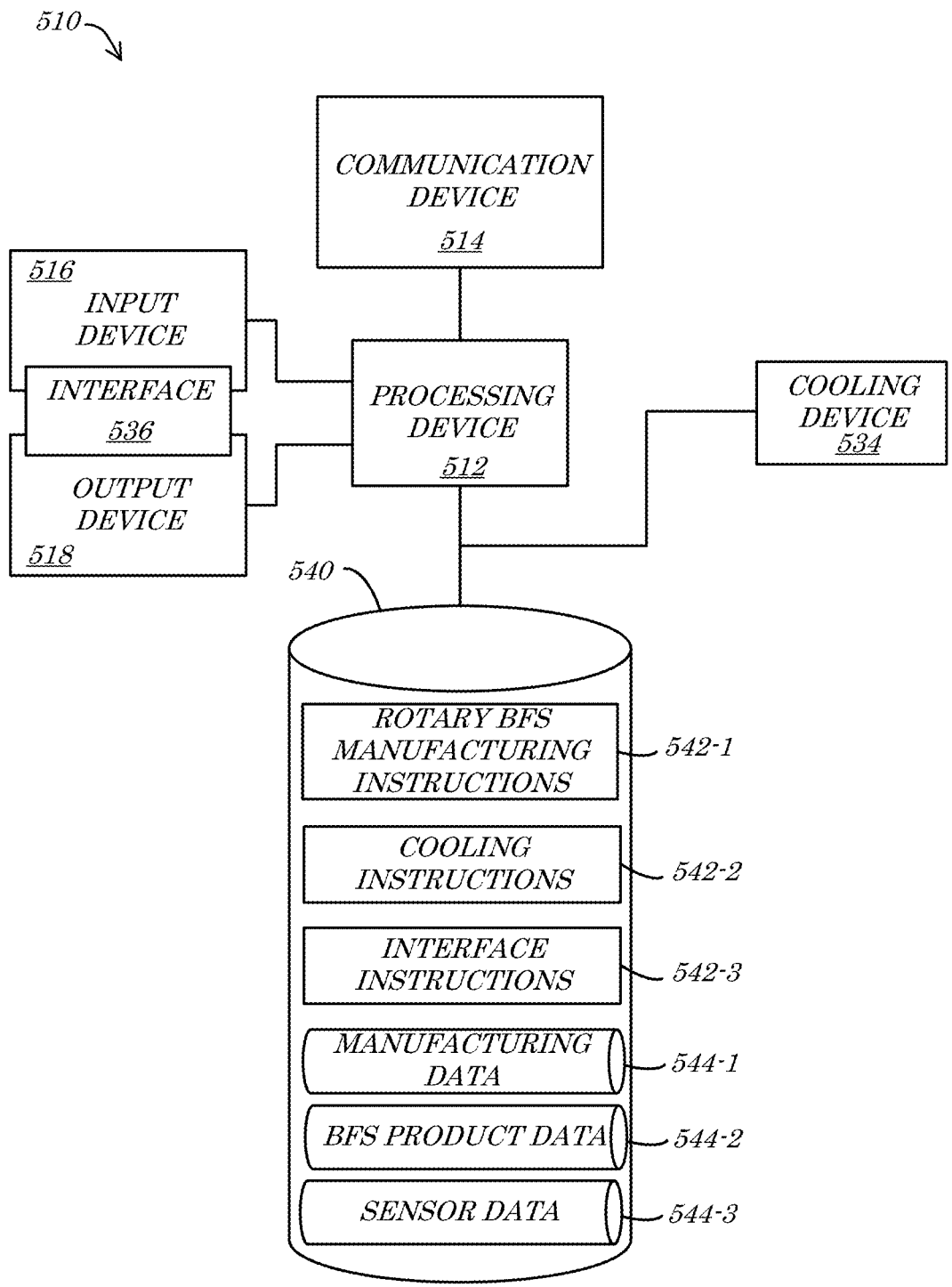
FIG. 5 is a block diagram of an apparatus according to some embodiments.
Figure 6A:
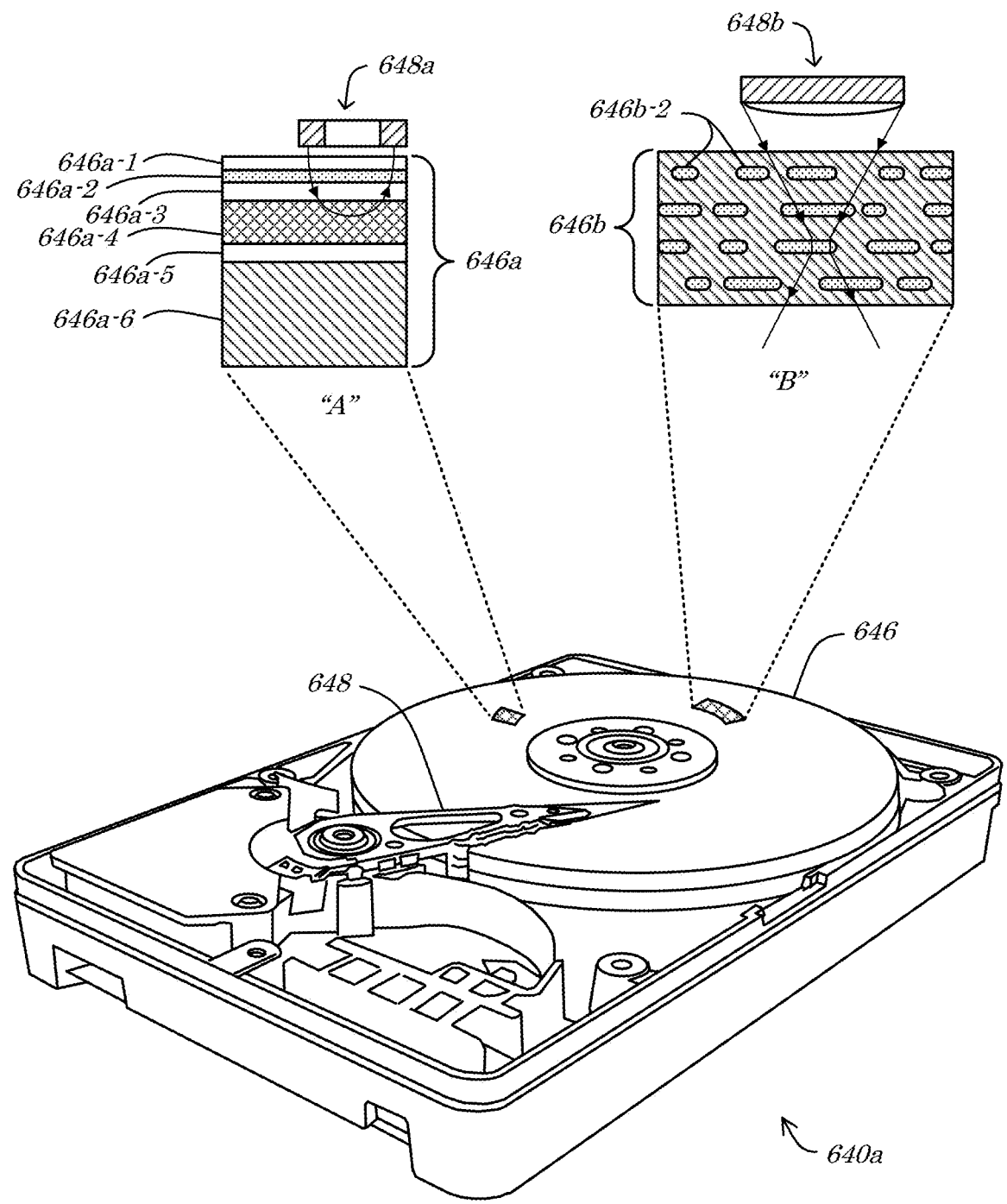
FIG. 6A, FIG. 6B, FIG. 6C, FIG. 6D, and FIG. 6E are perspective diagrams of exemplary data storage devices according to some embodiments.
Figure 6B:
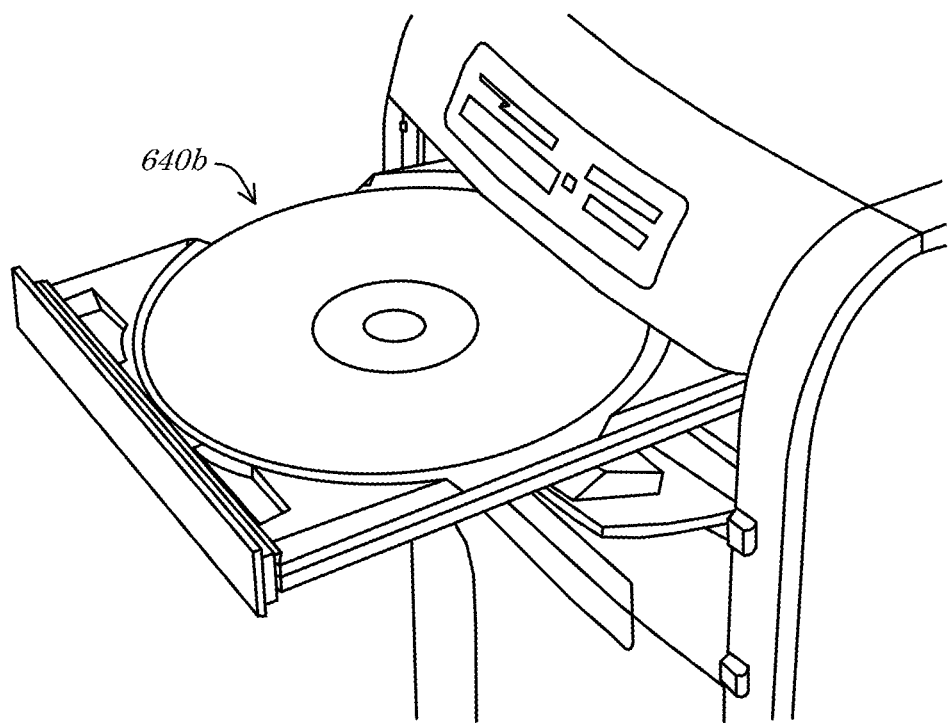
Figure 6C:
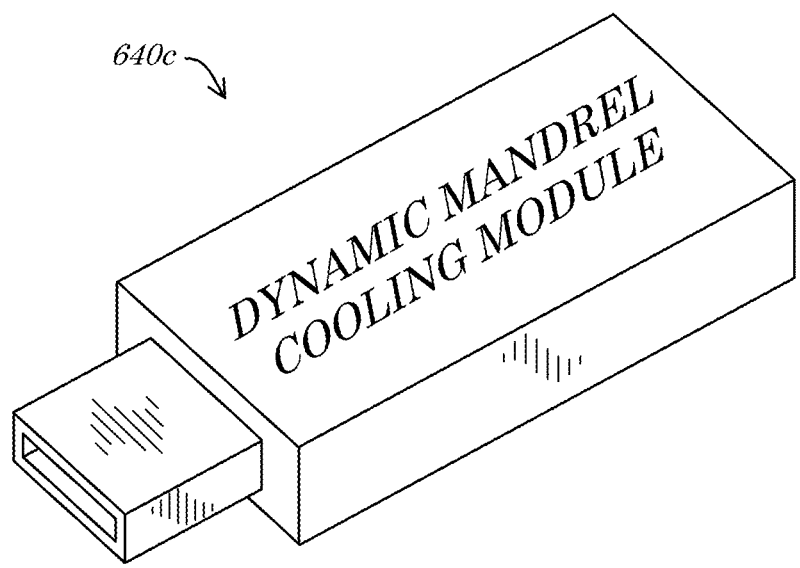
Figure 6D:
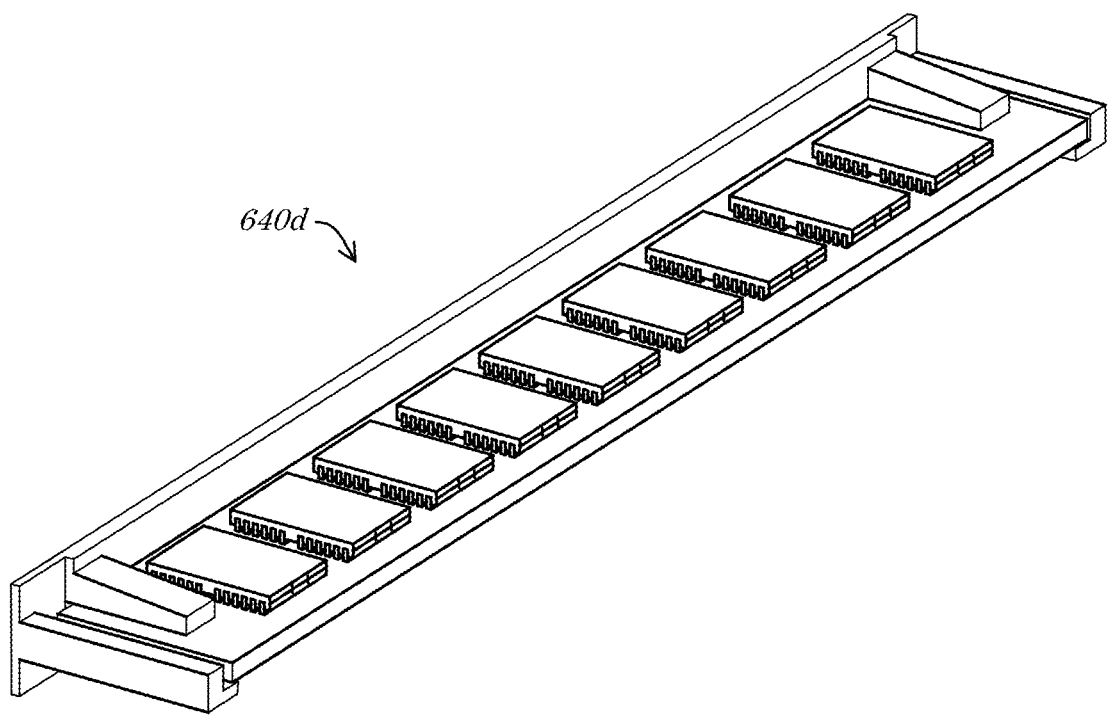
Figure 6E:
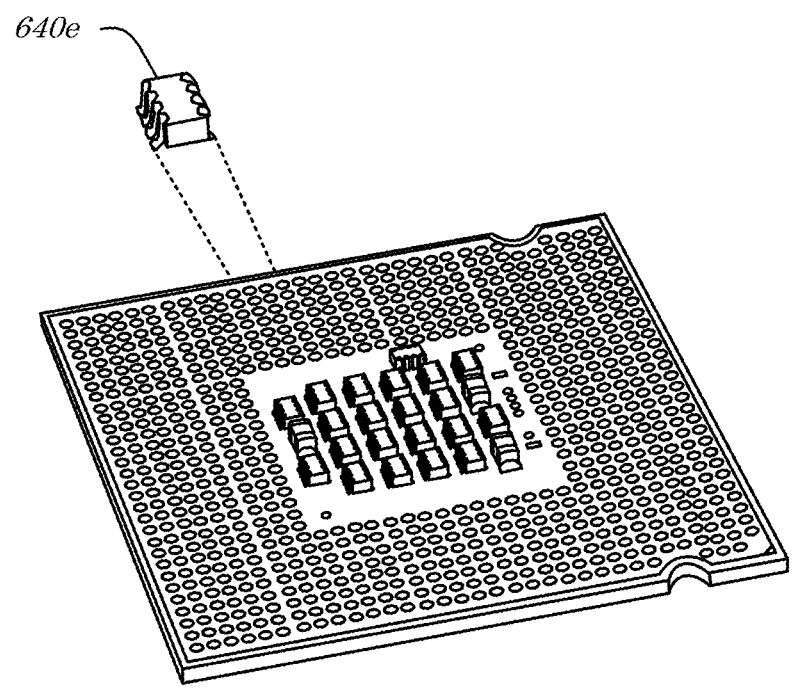

The data storage devices 640*a-e* may, for example, be utilized to store instructions and/or data, such as the BFS manufacturing instructions 542-1, cooling instructions 542-2, interface instructions 542-3, manufacturing data 544-1, BFS product data 544-2, and/or sensor data 544-3, each of which is presented in reference to FIG. 5 herein. In some embodiments, instructions stored on the data storage devices 640*a-e* may, when executed by a processor, cause the implementation of and/or facilitate the method 400 of FIG. 4 herein, and/or portions thereof.

According to some embodiments, the first data storage device 640*a* may comprise one or more various types of internal and/or external hard drives. The first data storage device 640*a* may, for example, comprise a data storage medium 646 that is read, interrogated, and/or otherwise communicatively coupled to and/or via a disk reading device 648. In some embodiments, the first data storage device 640*a* and/or the data storage medium 646 may be configured to store information utilizing one or more magnetic, inductive, and/or optical means (e.g., magnetic, inductive, and/or optical-encoding). The data storage medium 646, depicted as a first data storage medium 646*a* for example (e.g., breakout cross-section "A"), may comprise one or more of a polymer layer 646*a*-1, a magnetic data storage layer 646*a*-2, a non-magnetic layer 646*a*-3, a magnetic base layer 646*a*-4, a contact layer 646*a*-5, and/or a substrate layer 646*a*-6. According to some embodiments, a magnetic read head 648*a* may be coupled and/or disposed to read data from the magnetic data storage layer 646*a*-2.

In some embodiments, the data storage medium 646, depicted as a second data storage medium 646*b* for example (e.g., breakout cross-section "B"), may comprise a plurality of data points 646*b*-2 disposed with the second data storage medium 646*b*. The data points 646*b*-2 may, in some embodiments, be read and/or otherwise interfaced with via a laser-enabled read head 648*b* disposed and/or coupled to direct a laser beam through the second data storage medium 646*b*.

In some embodiments, the second data storage device 640*b* may comprise a CD, CD-ROM, DVD, Blu-Ray™ Disc, and/or other type of optically-encoded disk and/or other storage medium that is or becomes known or practicable. In some embodiments, the third data storage device 640*c* may comprise a USB keyfob, dongle, and/or other type of flash memory data storage device that is or becomes know or practicable. In some embodiments, the fourth data storage device 640*d* may comprise RAM of any type, quantity, and/or configuration that is or becomes practicable and/or desirable. In some embodiments, the fourth data storage device 640*d* may comprise an off-chip cache, such as a Level 2 (L2) cache memory device. According to some embodiments, the fifth data storage device 640*e* may comprise an on-chip memory device, such as a Level 1 (L1) cache memory device.

The data storage devices 640*a-e* depicted in FIG. 6A, FIG. 6B, FIG. 6C, FIG. 6D, and FIG. 6E are representative of a class and/or subset of computer-readable media that are defined herein as "computer-readable memory" (e.g., non-transitory memory devices as opposed to transmission devices or media). The data storage devices 640*a-e* may generally store program instructions, algorithms, software engines, code, and/or modules that, when executed by a processing device cause a particular machine to function in accordance with one or more embodiments described herein.

VI. Additional Embodiments

Some embodiments may comprise systems, methods, and/or articles of manufacture: (i) wherein the engaging that triggers a cooling setting change comprises an initiation of a filling of the BFS container; (ii) wherein the mandrel cooling circuit comprises a pump coupled to direct a fluid (i) into the filling mandrel via a cooling inlet, (ii) through a cooling outlet and into a first chilling unit, and (iii) from the first chilling unit back to the pump, and a first temperature sensor disposed between the pump and the cooling inlet and wherein the instructions, when executed by the controller device, further result in: (a) receiving, by the controller device and from the first temperature sensor, a first temperature reading, (b) comparing, by the controller device, the first temperature reading to a stored inlet temperature threshold corresponding to the second level of cooling, thereby defining a first comparison result, and/or (c) adjusting, by the controller device and based on the first comparison result, a setting of at least one of the pump and the first chilling unit; (iii) wherein the mandrel cooling circuit further comprises a second temperature sensor disposed between the cooling outlet and the first chilling unit and wherein the instructions, when executed by the controller device, further result in: (a) receiving, by the controller device and from the second temperature sensor, a second temperature reading, (b) comparing, by the controller device, the first temperature reading to at least one of a stored outlet temperature threshold corresponding to the second level of cooling and the first temperature reading, thereby defining a second comparison result, and/or (c) adjusting, by the controller device and based on the second comparison result, the setting of the at least one of the pump and the first chilling unit; (iv) wherein the mandrel cooling circuit further comprises an orifice coupled between the pump and the cooling inlet; and/or (v) wherein the orifice comprises a three-millimeter (3-mm) orifice.

In some embodiments, a rotary BFS manufacturing system, may comprise: (a) a controller device; (b) a rotary mold system in communication with the controller device; (c) a parison head coupled to a supply of plastic resin and in communication with the controller device; (d) a filling mandrel disposed within the parison head and comprising a mandrel cooling circuit; and (e) a non-transitory memory device storing instructions that when executed by the controller device result in: (i) setting, by the controller device, the mandrel cooling circuit to a first level of cooling; (ii) engaging, by the controller device and after the setting of the mandrel cooling circuit to the first level of cooling, the parison head, the rotary mold system, and the filling mandrel in coordination to produce a prefilled BFS container; and (iii) setting, by the controller device and after the engaging, the mandrel cooling circuit to a second level of cooling. According to some embodiments, the rotary BFS manufacturing system may be provided wherein the mandrel cooling circuit further comprises a pump coupled to direct a fluid (i) into the filling mandrel via a cooling inlet, (ii) through a cooling outlet and into a first chilling unit, and (iii) from the first chilling unit back to the pump, a first temperature sensor disposed between the pump and the cooling inlet, and a second chilling unit coupled between the pump and the cooling inlet. In some embodiments, the fluid may comprise glycol. According to some embodiments, the rotary BFS manufacturing system may be provided wherein the setting of the mandrel cooling circuit to the first level of cooling comprises setting the first chilling unit to a first temperature setting and wherein the setting of the mandrel cooling circuit to the second level of cooling comprises setting the first chilling unit to a second temperature setting. In some embodiments, the rotary BFS manufacturing system may be provided wherein the first and second temperature settings are between two degrees Celsius (2° C.) and fifty degrees Celsius (50° C.). According to some embodiments, the rotary BFS manufacturing system may be provided wherein the setting of the mandrel cooling circuit to the first level of cooling comprises setting the second chilling unit to a first temperature setting and wherein the setting of the mandrel cooling circuit to the second level of cooling comprises setting the second chilling unit to a second temperature setting. In some embodiments, the rotary BFS manufacturing system may be provided wherein the first and second temperature settings are between two degrees Celsius (2° C.) and twenty degrees Celsius (20° C.).

In some embodiments, a rotary BFS manufacturing method, may comprise: (a) setting, by a controller device in communication with (i) a rotary mold system, (ii) a parison head coupled to a supply of plastic resin, and (iii) a filling mandrel disposed within the parison head and comprising a mandrel cooling circuit, the mandrel cooling circuit to a first level of cooling; (b) engaging, by the controller device and after the setting of the mandrel cooling circuit to the first level of cooling, the parison head, the rotary mold system, and the filling mandrel in coordination to produce a prefilled BFS container; and (c) setting, by the controller device and after the engaging, the mandrel cooling circuit to a second level of cooling. According to some embodiments, the rotary BFS manufacturing method may be provided wherein the setting of the mandrel cooling circuit to the first level of cooling is conducted in response to an initiation of a first stage of a BFS manufacturing cycle and wherein the engaging comprises a second stage of the BFS manufacturing cycle. In some embodiments, the rotary BFS manufacturing method may be provided wherein the BFS manufacturing cycle is cyclical and the setting of the mandrel cooling circuit to the first level of cooling and the second level of cooling is repeated for each iteration of the cycle. According to some embodiments, the rotary BFS manufacturing method may be provided wherein the setting of the mandrel cooling circuit to the second level of cooling is conducted by the controller device in response to the engaging. In some embodiments, the rotary BFS manufacturing method may further comprise receiving, via an input device in communication with the controller device, input indicative of the second level of cooling. According to some embodiments, the rotary BFS manufacturing method may be provided wherein the setting of the mandrel cooling circuit to the second level of cooling is conducted by the controller device in response to the receiving. In some embodiments, the rotary BFS manufacturing method may be provided wherein the engaging comprises an initiation of an extrusion of the plastic resin by the parison head. According to some embodiments, the rotary BFS manufacturing method may be provided wherein the mandrel cooling circuit further comprises a pump coupled to direct a fluid (i) into the filling mandrel via a cooling inlet, (ii) through a cooling outlet and into a first chilling unit, and (iii) from the first chilling unit back to the pump, a first temperature sensor disposed between the pump and the cooling inlet, and a second chilling unit coupled between the pump and the cooling inlet. In some embodiments, the rotary BFS manufacturing method may further comprise: (d) receiving, by the controller device and from the first temperature sensor, a first temperature reading, (e) comparing, by the controller device, the first temperature reading to a stored inlet temperature threshold corresponding to the second level of cooling, thereby defining a first comparison result, and/or (f) adjusting, by the controller device and based on the first comparison result, a setting of at least one of the pump, the first chilling unit, and the second chilling unit. According to some embodiments, the rotary BFS manufacturing method may be provided wherein the mandrel cooling circuit further comprises a second temperature sensor disposed between the cooling outlet and the first chilling unit and wherein the method further comprises: (d) receiving, by the controller device and from the second temperature sensor, a second temperature reading, (e) comparing, by the controller device, the first temperature reading to at least one of a stored outlet temperature threshold corresponding to the second level of cooling and the first temperature reading, thereby defining a second comparison result, and/or (f) adjusting, by the controller device and based on the second comparison result, the setting of the at least one of the pump, the first chilling unit, and the second chilling unit. In some embodiments, the rotary BFS manufacturing method may be provided wherein the fluid comprises glycol. According to some embodiments, the rotary BFS manufacturing method may be provided wherein the setting of the mandrel cooling circuit to the first level of cooling comprises setting the first chilling unit to a first temperature setting and wherein the setting of the mandrel cooling circuit to the second level of cooling comprises setting the first chilling unit to a second temperature setting. In some embodiments, the rotary BFS manufacturing method may be provided wherein the first and second temperature settings are between two degrees Celsius (2° C.) and fifty degrees Celsius (50° C.). According to some embodiments, the rotary BFS manufacturing method may be provided wherein the setting of the mandrel cooling circuit to the first level of cooling comprises setting the second chilling unit to a first temperature setting and wherein the setting of the mandrel cooling circuit to the second level of cooling comprises setting the second chilling unit to a second temperature setting. In some embodiments, the rotary BFS manufacturing method may be provided wherein the first and second temperature settings are between two degrees Celsius (2° C.) and twenty degrees Celsius (20° C.). According to some embodiments, the rotary BFS manufacturing method may be provided wherein the setting of the mandrel cooling circuit to the first level of cooling comprises setting the first chilling unit to a first temperature setting and wherein the setting of the mandrel cooling circuit to the second level of cooling comprises setting the second chilling unit to a second temperature setting. In some embodiments, the rotary BFS manufacturing method may be provided wherein the first temperature setting is between twenty degrees Celsius (20° C.) and thirty degrees Celsius (30° C.) and wherein the second temperature setting is between two degrees Celsius (2° C.) and twelve degrees Celsius (12° C.).

VII. Multiple Inventive Embodiments Disclosed

Multiple inventive embodiments may be set forth and described in this disclose. Some embodiments may comprise and/or define various systems, methods, articles of manufacture, apparatus, and/or devices that are either stand-alone or may be utilized together. If described as stand-alone, this does not necessarily preclude interoperability with the other disclosed embodiments. Indeed, by being included in the same disclosure, Applicant has anticipated some degree of relation between the disclosed embodiments. If described as cooperative, this does not necessarily preclude stand-alone or alternative operability. Particularly with respect to described systems, for example, while various components are described in relation to their interoperability in some embodiments, in other embodiments one or more of such components may be operative to function without the other (and/or with another component, whether disclosed or not). As such, Applicant expressly reserves the right to pursue inventive material in accordance with any differently numbered set of figures, or combinations or portions thereof, in different application filings.

This disclosure may accordingly contain multiple inventive embodiments that may individually comprise inventive material, despite being described in certain embodiments with other inventive material. Different objects disclosed in different numbered figure sets, for example, may in some cases comprise different inventive components that alone constitute the broadest extents of the disclosure herein (e.g., with or without the other different numbered figure set components). In some embodiments, the combination and/or interaction of a subset of the components may comprise inventive subject matter. The described dynamic and/or multi-circuit mandrel cooling herein may, for example, be inventive with or without one or more of the other components such as mold and/or BFS product cooling devices, which may or may not be utilized on some BFS machines. Similarly, the dynamic mandrel cooling described herein may be effectuated by a subset of the depicted and/or described components without the others being necessary, unless expressly identified herein as being critical to the functionality thereof.

In some embodiments, each of the separate components of the BFS manufacturing system may comprise different and/or stand-alone inventions. The BFS machine with dynamic mandrel cooling utilizing a single mandrel cooling circuit and the described features and/or components thereof may comprise a first invention, for example, while the rotary BFS machine with first and second mandrel cooling circuits and the described features and/or components thereof may comprise a second invention, and/or the controller device that is configured/programmed to effectuate dynamic mandrel cooling may comprise a third invention. In some embodiments the different inventive subject matter and/or inventions may be utilized together in one or more combined systems or configurations (which themselves may be considered different inventive combinations) while in other embodiments the different inventive subject matter and/or inventions may be utilized separately from one another. Similarly, while each component described herein is described with respect to various possible features and/or configurations, each component may exist, in some embodiments, with only a single such described feature and/or configuration. With specific reference to FIG. 2, for example, while many components of that may (or may not) be included in a BFS machine 210 are show for purposes of illustration, only the subset of components that may be claimed with respect to specific inventive structure and/or functionality may be necessary or included in a claimed inventive system/process. The addition of other described and/or depicted components and/or functionality should not, however, detract from the inventiveness or patentability of any broader inventive and/or claimed concepts with which they are included. In some embodiments, each separate set of drawings provided with the specification may comprise a separate and/or stand-alone invention.

VIII. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

While the setting of cooling levels and/or temperature set points for various cooling devices/circuits is described herein, it should be understood that because there may be a difference between system set points and actual temperatures within the systems (e.g., cooling fluid and/or fill product temperatures), the "setting" may comprise the definition of system parameter values and/or the control of the system parameter values required to achieve the set temperature(s) of the fluid therein.

As used herein, the term "coupled" may generally refer to any type or configuration of coupling that is or becomes known or practicable. Coupling may be descriptive, for example, of two or more objects, devices, and/or components that are communicatively coupled, mechanically coupled, electrically coupled, and/or magnetically coupled. The term "communicatively coupled" generally refers to any type or configuration of coupling that places two or more objects, devices, components, or portions, elements, or combinations thereof in communication. Mechanical, electrical, fluid, and magnetic communications are examples of such communications. The term "mechanically coupled" generally refers to any physical binding, adherence, attachment, and/or other form of physical contact between two or more objects, devices, components, or portions, elements, or combinations thereof. The term "electrically coupled" indicates that one or more objects, devices, components, or portions, elements, or combinations thereof, are in electrical contact such that an electrical signal, pulse, or current (e.g., electrical energy) is capable of passing between the one or more objects, enabling the objects to electrically communicate with one another. In some embodiments, electrical coupling may enable electrical energy to be transmitted wirelessly between two or more objects and/or devices. The term "magnetically coupled" indicates that one or more objects, devices, components, or portions, elements, or combinations thereof, are within one or more associated magnetic fields. Objects may be electrically and/or magnetically coupled without themselves being physically attached or mechanically coupled. For example, objects may communicate electrically through various wireless forms of communication or may be within (at least partially) a magnetic field, without being physically touching or even adjacent. The terms "hydraulically coupled" or "fluidly coupled" indicate that one or more objects, devices, components, or portions, elements, or combinations thereof, are in hydraulic/fluid contact such that fluid flow, pressure, and/or action (e.g., wave action) is capable of passing between the one or more objects, enabling the objects to hydraulically/fluidly communicate with one another.

References to "interior" or "exterior" are references to areas and/or portions of an object with respect to other features such as holes, volumes, ports, passages, conduits, etc. Such objects necessarily comprise and/or define various "surfaces" such as an interior, exterior, inner, outer, inside, and/or outside surface. References to the different areas and/or portions are accordingly also references to the associated surfaces.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The terms "including", "comprising" and variations thereof mean "including but not limited to", unless expressly specified otherwise.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A rotary Blow-Fill-Seal (BFS) manufacturing system, comprising:
    a controller device;
    a rotary mold system in communication with the controller device;
    a parison head coupled to a supply of plastic resin and in communication with the controller device;
    a filling mandrel disposed within the parison head and comprising a mandrel cooling circuit; and
    a non-transitory memory device storing instructions that when executed by the controller device result in:
        setting, by the controller device, the mandrel cooling circuit to a first level of cooling;
        engaging, by the controller device and after the setting of the mandrel cooling circuit to the first level of cooling, the parison head, the rotary mold system, and the filling mandrel in coordination to produce a prefilled BFS container; and
        setting, by the controller device and after the engaging, the mandrel cooling circuit to a second level of cooling.

2. The rotary BFS manufacturing system of claim 1, wherein the engaging comprises an initiation of an extrusion of the plastic resin by the parison head.

3. The rotary BFS manufacturing system of claim 1, wherein the mandrel cooling circuit further comprises a pump coupled to direct a fluid (i) into the filling mandrel via a cooling inlet, (ii) through a cooling outlet and into a first chilling unit, and (iii) from the first chilling unit back to the pump, a first temperature sensor disposed between the pump and the cooling inlet, and a second chilling unit coupled between the pump and the cooling inlet.

4. The rotary BFS manufacturing system of claim 3, wherein the instructions, when executed by the controller device, further result in:
    receiving, by the controller device and from the first temperature sensor, a first temperature reading;
    comparing, by the controller device, the first temperature reading to a stored inlet temperature threshold corresponding to the second level of cooling, thereby defining a first comparison result; and
    adjusting, by the controller device and based on the first comparison result, a setting of at least one of the pump, the first chilling unit, and the second chilling unit.

5. The rotary BFS manufacturing system of claim 3, wherein the mandrel cooling circuit further comprises a second temperature sensor disposed between the cooling outlet and the first chilling unit and wherein the instructions, when executed by the controller device, further result in:
    receiving, by the controller device and from the second temperature sensor, a second temperature reading;
    comparing, by the controller device, the first temperature reading to at least one of a stored outlet temperature threshold corresponding to the second level of cooling and the first temperature reading, thereby defining a second comparison result; and
    adjusting, by the controller device and based on the second comparison result, the setting of the at least one of the pump, the first chilling unit, and the second chilling unit.

6. The rotary BFS manufacturing system of claim 3, wherein the fluid comprises glycol.

7. The rotary BFS manufacturing system of claim 3, wherein the mandrel cooling circuit further comprises an orifice coupled between the pump and the cooling inlet.

8. The rotary BFS manufacturing system of claim 7, wherein the orifice comprises a three-millimeter (3-mm) orifice.

9. The rotary BFS manufacturing system of claim 3, wherein the setting of the mandrel cooling circuit to the first level of cooling comprises setting the first chilling unit to a first temperature setting and wherein the setting of the mandrel cooling circuit to the second level of cooling comprises setting the second chilling unit to a second temperature setting.

10. The rotary BFS manufacturing system of claim 9, wherein the first temperature setting is between twenty degrees Celsius (20° C.) and thirty degrees Celsius (30° C.) and wherein the second temperature setting is between two degrees Celsius (2° C.) and twelve degrees Celsius (12° C.).

11. The rotary BFS manufacturing system of claim 1, wherein the setting of the mandrel cooling circuit to the first level of cooling is conducted in response to an initiation of a first stage of a BFS manufacturing cycle and wherein the engaging comprises a second stage of the BFS manufacturing cycle.

12. The rotary BFS manufacturing system of claim 11, wherein the BFS manufacturing cycle is cyclical and the setting of the mandrel cooling circuit to the first level of cooling and the second level of cooling is repeated for each iteration of the cycle.

13. The rotary BFS manufacturing system of claim 1, wherein the setting of the mandrel cooling circuit to the second level of cooling is conducted by the controller device in response to the engaging.

14. The rotary BFS manufacturing system of claim 1, wherein the instructions, when executed by the controller device, further result in:

receiving, via an input device in communication with the controller device, input indicative of the second level of cooling.

15. The rotary BFS manufacturing system of claim 14, wherein the setting of the mandrel cooling circuit to the second level of cooling is conducted by the controller device in response to the receiving.

16. The rotary BFS manufacturing system of claim 1, wherein the engaging comprises an initiation of a filling of the BFS container.

17. The rotary BFS manufacturing system of claim 1, wherein the mandrel cooling circuit comprises a pump coupled to direct a fluid (i) into the filling mandrel via a cooling inlet, (ii) through a cooling outlet and into a first chilling unit, and (iii) from the first chilling unit back to the pump, and a first temperature sensor disposed between the pump and the cooling inlet and wherein the instructions, when executed by the controller device, further result in:

receiving, by the controller device and from the first temperature sensor, a first temperature reading;

comparing, by the controller device, the first temperature reading to a stored inlet temperature threshold corresponding to the second level of cooling, thereby defining a first comparison result; and adjusting, by the controller device and based on the first comparison result, a setting of at least one of the pump and the first chilling unit.

18. The rotary BFS manufacturing system of claim 17, wherein the mandrel cooling circuit further comprises a second temperature sensor disposed between the cooling outlet and the first chilling unit and wherein the instructions, when executed by the controller device, further result in:

receiving, by the controller device and from the second temperature sensor, a second temperature reading;

comparing, by the controller device, the first temperature reading to at least one of a stored outlet temperature threshold corresponding to the second level of cooling and the first temperature reading, thereby defining a second comparison result; and adjusting, by the controller device and based on the second comparison result, the setting of the at least one of the pump and the first chilling unit.

\* \* \* \* \*